United States Patent
Schreiber et al.

(10) Patent No.: US 11,174,670 B2
(45) Date of Patent: Nov. 16, 2021

(54) INSULATING GLAZING COMPRISING A PRESSURE EQUALIZATION BODY WITH A MEMBRANE AND A CAPILLARY

(71) Applicant: SAINT-GOBAIN GLASS FRANCE, Courbevoie (FR)

(72) Inventors: Walter Schreiber, Aachen (DE); Florian Carre, Aachen (DE); Dirk Nüsser, Übach-Palenberg (DE); Erol Ertugrul Sacu, Stolberg (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/770,292

(22) PCT Filed: Nov. 29, 2018

(86) PCT No.: PCT/EP2018/082969
§ 371 (c)(1),
(2) Date: Jun. 5, 2020

(87) PCT Pub. No.: WO2019/110409
PCT Pub. Date: Jun. 13, 2019

(65) Prior Publication Data
US 2021/0172242 A1    Jun. 10, 2021

(30) Foreign Application Priority Data
Dec. 7, 2017  (EP) .................................... 17205924

(51) Int. Cl.
*E06B 3/67*    (2006.01)
*E06B 3/663*   (2006.01)
(Continued)

(52) U.S. Cl.
CPC ............ *E06B 3/67* (2013.01); *E06B 3/66314* (2013.01); *E06B 3/67326* (2013.01); *E06B 3/66* (2013.01);
(Continued)

(58) Field of Classification Search
CPC .......... E06B 3/66; E06B 3/6612; E06B 3/673; E06B 3/67; E06B 3/67326;
(Continued)

(56) References Cited

U.S. PATENT DOCUMENTS 2,880,475 A * 4/1959 Mills .................... E06B 3/67386
                                                        52/204.52
4,952,430 A * 8/1990 Bowser .................... E06B 3/677
                                                           428/192
(Continued)

FOREIGN PATENT DOCUMENTS

| CH | 687937 A5 | 3/1997 |
|---|---|---|
| CN | 203271539 U | 11/2013 |

(Continued)

OTHER PUBLICATIONS

International Search Report as issued in International Application No. PCT/EP2018/082969, dated Dec. 21, 2018.
(Continued)

*Primary Examiner* — Donald J Loney
(74) *Attorney, Agent, or Firm* — Pillsbury Winthrop Shaw Pittman LLP

(57) ABSTRACT

An insulating glazing having a pressure equalization body includes a capillary and a membrane, wherein a first pane is mounted on a first pane contact surface of the spacer and a second pane is mounted on a second pane contact surface of the spacer, the first and second panes and the glazing interior surface of the spacer enclose an inner interpane space, the first and second panes and the outer surface of the spacer
(Continued)

Figure 1A:
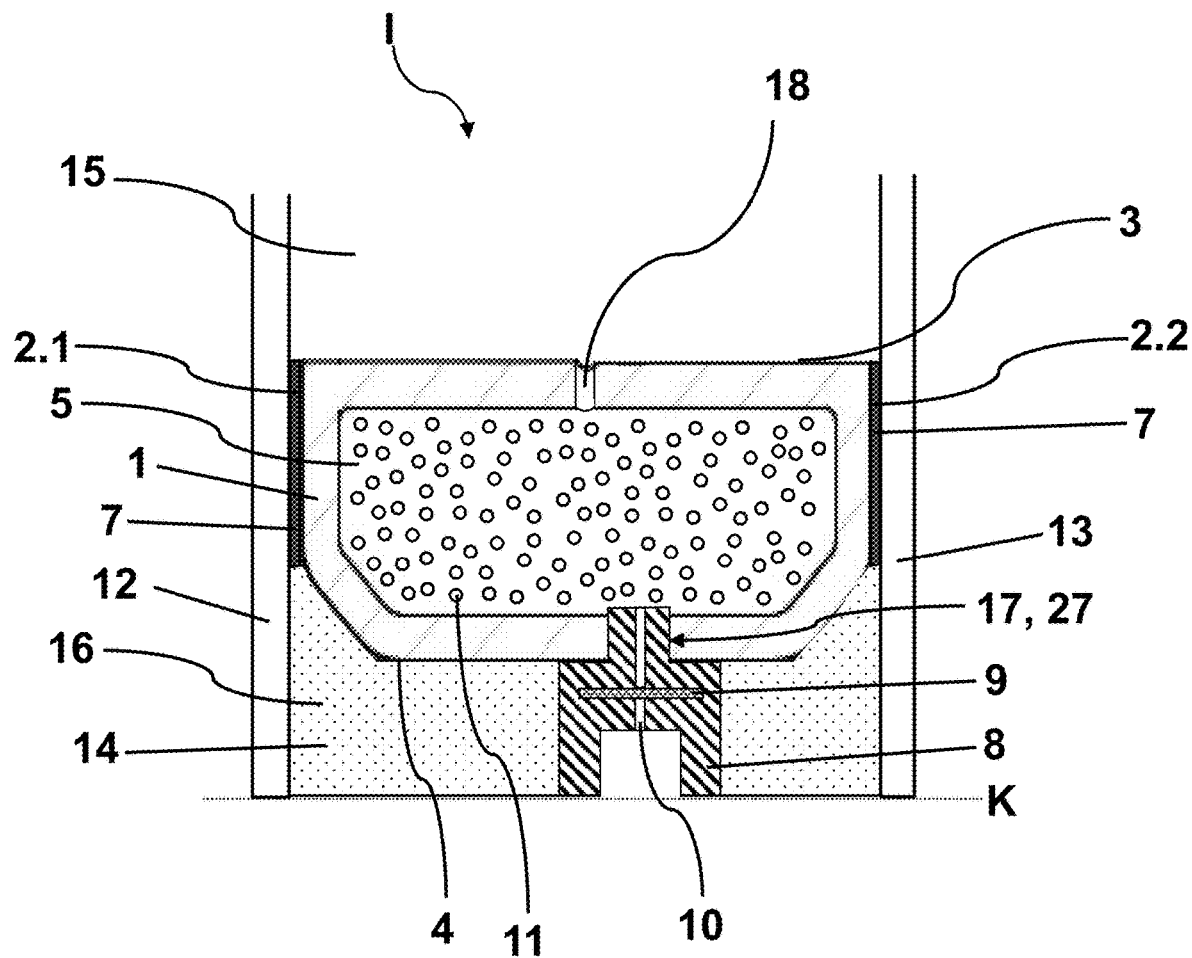

enclose an outer interpane space, the pressure equalization body is inserted into an opening on the outer surface, the pressure equalization body contains a gas-permeable membrane and a capillary, the inner interpane space is gas-permeably connected to the atmosphere via the capillary and the membrane, and the capillary has, in at least one section, a diameter less than or equal to 1.2 mm.

20 Claims, 8 Drawing Sheets

(51) Int. Cl.
   *E06B 3/673* (2006.01)
   *E06B 3/66* (2006.01)
(52) U.S. Cl.
   CPC ......... *E06B 3/6612* (2013.01); *E06B 3/66352* (2013.01); *E06B 3/673* (2013.01); *Y02A 30/249* (2018.01); *Y02B 80/22* (2013.01)
(58) Field of Classification Search
   CPC ............. E06B 3/66314; E06B 3/66352; Y02A 30/249; Y02B 80/22
   See application file for complete search history.

(56) References Cited

U.S. PATENT DOCUMENTS

| | | | |
|---|---|---|---|
| 2005/0034386 | A1 | 2/2005 | Crandell et al. |
| 2012/0017524 | A1 | 1/2012 | Milburn et al. |
| 2015/0322708 | A1 | 11/2015 | Kotowski et al. |
| 2018/0252021 | A1 | 9/2018 | Frank et al. |

FOREIGN PATENT DOCUMENTS

| | | | |
|---|---|---|---|
| CN | 104870738 | A | 8/2015 |
| CN | 205604997 | U | 9/2016 |
| CN | 205876073 | U | 1/2017 |
| CN | 205895039 | U | 1/2017 |
| CN | 205955565 | U | 2/2017 |
| CN | 106567650 | A | 4/2017 |
| CN | 206091765 | U | 4/2017 |
| DE | 696 07 473 | T2 | 9/2000 |
| DE | 199 27 683 | C1 | 1/2001 |
| DE | 10 2009 006 062 | A1 | 7/2010 |
| EP | 0 345 211 | A2 | 12/1989 |
| EP | 1 218 307 | B1 | 7/2002 |
| EP | 0 912 455 | B1 | 5/2006 |
| EP | 1 917 222 | B1 | 5/2008 |
| EP | 2 006 481 | A2 | 12/2008 |
| EP | 2 146 039 | B1 | 3/2013 |
| FR | 2 671 128 | A1 | 7/1992 |
| JP | H11-92180 | A | 4/1999 |
| JP | 2016-506465 | A | 3/2016 |
| RU | 2382163 | C2 | 2/2010 |
| RU | 2432329 | C2 | 10/2011 |
| WO | WO 90/02239 | A1 | 3/1990 |
| WO | WO 01/21540 | A1 | 3/2001 |
| WO | WO 2007/042688 | A1 | 4/2007 |
| WO | WO 2007/101964 | A1 | 9/2007 |
| WO | WO 2013/104507 | A1 | 7/2013 |
| WO | WO 2014/095097 | A1 | 6/2014 |
| WO | WO 2014/198431 | A1 | 12/2014 |
| WO | WO 2015/197491 | A1 | 12/2015 |
| WO | WO 2017/064160 | A1 | 4/2017 |
| WO | WO 2017/064166 | A1 | 4/2017 |

OTHER PUBLICATIONS

Notice of Allowance as issued in Japanese Patent Application No. 2020-544979, dated Jun. 8, 2021.

Decision to Grant as issued in European Patent Application No. 18807372.0, dated Apr. 28, 2021.

First Office Action as issued in Chinese Patent Application No. 201880079076.4, dated May 11, 2021.

* cited by examiner

INSULATING GLAZING COMPRISING A PRESSURE EQUALIZATION BODY WITH A MEMBRANE AND A CAPILLARY

CROSS-REFERENCE TO RELATED APPLICATIONS

This application is the U.S. National Stage of PCT/EP2018/082969, filed Nov. 29, 2018, which in turn claims priority to European patent application number 17205924.8 filed Dec. 7, 2017. The content of these applications are incorporated herein by reference in their entireties.

The invention relates to an insulating glazing comprising a pressure equalization body with a membrane and a capillary, a method for production thereof, and use thereof.

Buildings frequently lose the greatest share of heat via external glazing such that as a result of increasingly stringent energy-saving regulations, it is no longer possible to imagine the building construction sector without insulating glazings. From an energy standpoint, maximizing the insulating interpane spaces of insulating glazing is desirable in order to reduce the heat transfer through the pane composite. The size of the interpane spaces of an insulating glazing is however limited by the climate loads acting on the glazing. In this context, climate loads are the bending stresses occurring in the insulating glazing as a result of environmental influences.

Insulating glazings are designed as a hermetically sealed system in which the interpane spaces communicate neither with one another nor with the environment. This prevents moisture from the environment from penetrating into the interpane spaces and condensing there or any filling gas from escaping. However, a disadvantage of this design is the lack of pressure equalization between the interpane spaces and the environment. When the topography of the location of production of the insulating glass and the installation location differ greatly, for example, insulating glass production at 100 meters above sea level and installation location 1000 meters above sea level, the panes of the insulating glazing are exposed to a permanent bending load after installation. This affects the stability of the edge region in particular. In the edge region, the panes are bonded to a spacer situated between the individual panes. Depending on the difference in pressure between the interpane space and the environment, this bond is subjected to compression or tension, which, depending on the strength of the forces acting, results in leakage of the edge seal and thus in failure of the insulating glazing. Moreover, climate loads occur not only as a result of pressure differences between the installation site and the production site, but also as a result of weather-dependent changes in air pressure. This is also problematic in terms of solar protection systems, for example, louvered blinds that can be installed in the interpane space. Inward bending of the panes in the direction of the blinds can impede their function. The greater the volume of air of the insulating glazing, the greater the influence of climate loads. As a result, the width of the interpane space is undesirably restricted.

Various technical concepts are known for achieving pressure equalization between the interpane space and the atmosphere. The central problem occurring here is avoiding condensation in the interpane space. The humidity in the interpane space must be kept as low as possible to counteract condensation. Moreover, excessively high humidity results, for example, in corrosion damage to metallic coatings within the insulating glazing. Such metallic coatings are applied on the insides of the outer panes of a double glazing or, in the case of a multi-glazing, on one of the inner panes. Usually, these are so-called "low-E coatings" that reduce the transmittance in the infrared range of the light spectrum and thus mitigate the strong heating of the interior of the building due to solar radiation. In systems for pressure equalization between the interpane space and the atmosphere, it is thus essential to minimize the entry of humidity into the interpane space.

EP 2 006 481 A2 discloses a device for pressure equalization for insulating glazing units with an enclosed gas volume, wherein a pressure equalization valve is inserted into the spacer of the insulating glazing. However, such pressure equalization valves have a complicated mechanism in the form of multiple movable parts that not only result in increased error susceptibility of the system but also cause significantly higher production costs. The relatively long pressure equalization times of these insulating glazing systems are another disadvantage. Extended storage is required before delivery of the glazing compared to systems without pressure equalization. In addition, pressure equalization valves only enable exchange of limited volumes, as a result of which, in particular with large panes, multiple valves are necessary and each additional valve weakens the system and entails additional production expense.

Pressure equalization between a glazing interior and the environment is also possible via capillary tubes. These can be introduced into the glazing in a variety of ways, for example, in the form of a capillary tube passing directly through the spacer (CH 687937 A5) or also as a corner connector with an integrated capillary tube in accordance with WO 2017/064160. Capillary tubes have the disadvantage that a certain minimum length of the capillary is required to prevent the entry of water into the inner interpane space. Thus, WO 2017/064160 proposes a minimum length of approx. 60 cm in extended form. With a small glazing size, CH 687937 A5 assumes a capillary tube with an inner diameter of 0.4 mm and a length of 30 cm.

Known from US 2012/0017524 A1 are pressure equalization tubes with a comparatively short length of approx. 10 cm. However, these do not prevent the entry of moisture into the glazing interior. In order to prevent the formation of condensation in this case, US 2012/0017524 A1 provides water absorbing materials in the inner interpane space. These are capable of buffering moisture by absorption and desorption. Such a design is difficult to implement industrially since the absorbing surfaces should be placed as inconspicuously as possible in the interpane space and must be dimensioned sufficiently large.

In EP 0345211 A2, an external desiccant container is connected to the inner interpane space of an insulating glazing via a pipe socket. The desiccant container is interchangeable such that when the desiccant is completely saturated with moisture, it can be replaced. In a further embodiment, the assembly contains an external expansion vessel that compensates pressure differences between the pane interior and the environment by deformation. The desiccant container itself can either be implemented as the expansion vessel or be provided in addition to the expansion vessel.

US 2005/0034386 A1 describes a window frame with a ventilation tube integrated into the frame, enabling air exchange and pressure equalization between the pane interior and the environment. The ventilation tube is used for temporary equalization and is closed after installation of the insulating glazing. For this purpose, the ventilation tube can, for example, be compressed and enclosed by sealant. In other embodiments, the ventilation is done by inserting a hollow needle or by unscrewing a screw. Also disclosed are embodiments in which a desiccant is mounted on the ventilation tube such that the air entering the pane interior is pre-dried.

WO 90/02239 discloses a thermoplastic spacer for insulating glazings, in which a system provided for compensation of pressure fluctuation consisting of a diaphragm between two chambers is introduced. The system of chambers and diaphragm is installed completely within the spacer main body and formed in one piece therewith, preferably by extrusion. One of the chambers is connected to the inner interpane space via an opening, whereas the other chamber communicates with the outer interpane space via an opening. The two chambers are completely separated from one another by the impermeable diaphragm. Depending on the climate conditions and the associated pressure conditions in the insulating glazing, the diaphragm is pressed in the direction of one chamber or the other. As a result, temporary pressure fluctuations are compensated.

Pressure equalization is not possible with this system. In order to compensate for pressure differences between the production site and the installation site of the insulating glazing, in accordance with WO 90/02239, a hollow needle is inserted at one corner of the insulating glazing and removed again after pressure equalization has occurred. Such manual pressure equalization at the installation site is time-consuming.

The object of the invention is to provide an improved insulating glazing with a pressure equalization system that overcomes the aforementioned disadvantages of the prior art, enables pressure equalization over the long-term, and prevents penetration of moisture into the glazing interior. A further object of the invention is to provide a method for producing an insulating glazing with a pressure equalization system that can be readily integrated into the industrial production process.

The object of the present invention is accomplished according to the invention by an insulating glazing according to the independent claim 1. Preferred embodiments of the invention are apparent from the dependent claims.

The insulating glazing comprises at least one first pane, a second pane, and a circumferential spacer arranged between the first and the second pane. The spacer for the insulating glazing according to the invention comprises at least a first pane contact surface and, extending parallel thereto, a second pane contact surface, a glazing interior surface, and an outer surface. The first pane is mounted on the first pane contact surface of the spacer, while the second pane is mounted on the second pane contact surface. Thus, the first pane, the second pane, and the glazing interior surface enclose an inner interpane space. The insulating glazing according to the invention further includes a pressure equalization body, which is inserted into an opening on the outer surface of the spacer. The pressure equalization body effects an air exchange and the associated pressure equalization between the inner interpane space and the ambient air. For this, the pressure equalization body contains at least one gas-permeable membrane and at least one capillary. The capillary has at least one capillary section, in which the inner diameter of the capillary is less than or equal to 1.2 mm. The inner interpane space of the insulating glazing is gas-permeably connected to the atmosphere surrounding the insulating glazing via the capillary and the membrane. In the context of the invention, pressuring equalization thus occurs by means of a diffusion process through the capillary and the membrane. The combination according to the invention of membrane and capillary makes possible, on the one hand, an air exchange and, associated therewith, a pressure equalization; whereas, on the other hand, there is sufficient tightness against the entry of moisture. The pressure equalization via the pressure equalization body according to the invention takes place permanently, with no manual steps whatsoever required to initiate this pressure equalization.

Thus, even under changing weather conditions, the insulating glazing according to the invention has improved stability of the edge region and increased service life, since the occurrence of bending stresses is avoided by the pressure equalization between the glazing interior and the environment. Furthermore, the entry of moisture into the interpane space is minimized such that no condensation occurs in the glazing interior. Moreover, time-consuming manual measures for pressure equalization of the insulating glazing at the installation site can be dispensed with.

The pressure equalization body according to the invention is inserted into an opening on the outer surface of the spacer. Consequently, the pressure equalization body can be used in any spacer regardless of its construction and need not already be integrated into the interior of the spacer at the time of production of the spacer.

The first pane contact surface and the second pane contact surface are the sides of the spacer on which the outer panes (first pane and second pane) of an insulating glazing are mounted during installation of the spacer. The first pane contact surface and the second pane contact surface run parallel to one another.

The glazing interior surface is defined as the surface of the spacer main body that points in the direction of the interior of the glazing after installation of the spacer in an insulating glazing. The glazing interior surface lies between the first and the second pane.

The outer surface of the spacer main body is the side opposite the glazing interior surface, which points away from the interior of the insulating glazing in the direction of an outer seal.

The outer surface of the spacer can, in a possible embodiment, be angled adjacent the pane contact surfaces in each case, yielding increased stability of the polymeric main body. The outer surface can be angled adjacent the pane contact surfaces, for example, by 30-60° in each case, relative to the outer surface.

The outer interpane space is defined as the space delimited by the first pane, the second pane, and the outer surface of the spacer.

The pressure equalization body protrudes at least partially into the outer interpane space. Another part of the pressure equalization body is introduced into the outer surface of the spacer. Because of the fact that the pressure equalization body is installed in the outer interpane space, it can also be introduced therein after the plugging together or extrusion of the spacer. The combination according to the invention of membrane and capillary in a pressure equalization body represents a particularly space-saving solution for pressure equalization. The pressure equalization body protrudes beyond the common peripheral edge of the first pane and the second pane by less than 10 mm, preferably by less than 5 mm, particularly preferably by less than 2 mm. Thus, the pressure equalization body can be completely or at least partially integrated into the edge seal of the insulating glazing and represents no spatial obstacle during installation of the insulating glazing in a window frame. In a particularly preferred embodiment, the pressure equalization body does not protrude substantially beyond the common peripheral edge of the insulating glazing. Thus, the pressure equalization body is integrated flush in the edge seal, comprising the sealant and the outer seal, and the insulating glazing can be installed in the window frame without special precautions.

Diffusion-open membranes are usually not selective such that not only all gaseous components of the air (nitrogen, oxygen, noble gases, carbon dioxide) pass through the membrane, but it is also permeable to water vapor. Liquid water, for example, in the form of a drop of water situated on the outer seal of the insulating glazing is retained by the membrane and thus cannot enter the glazing. In addition to water drop tightness, the membrane is decisive for controlling air volume flow. Without the use of a membrane, the air volume flow is too high, as a result of which the total amount of moisture introduced into the glazing is also undesirably high. The membrane enables control of the air volume flow by targeted selection of the membrane material.

However, the use of a membrane alone is insufficient for achieving satisfactory results in terms of the entry of moisture into the glazing. Although the entry of moisture through a pressure equalization body with a membrane is less than the unimpeded entry of moisture without a membrane, this is inadequate for preventing condensation in the interpane space under all weather conditions.

In addition to a membrane, the pressure equalization body according to the invention contains a capillary. The term "capillary" is generally understood to mean long cavities with very small internal diameters. The present capillary has, in at least one section of the capillary, an inner diameter of at most 1.2 mm. Experiments by the inventors have shown that, in this range, good results are obtained in terms of ventilation of the interpane space and the entry of moisture into the interpane space.

The volume flow through capillaries is described under the assumption of a laminar stationary flow pattern of the capillary and under the assumption of air as a homogeneous Newtonian fluid using the Hagen-Poiseuille equation:

$$\dot{V} = \frac{dV}{dt} = \frac{\pi \cdot r^4}{8 \cdot \eta} \frac{\Delta p}{l}$$

with $\dot{V}$     volume flow in $\frac{m^3}{s}$ $r$     inner radius of the capillary in m $\Delta p$     pressure difference between the two ends of the capillary in Pa $\eta$     dynamic viscosity of the fluid flowing through in Pa·s $l$     length of the capillary in m Consequently, parameters to be considered in design are the inner radius as well as the length of the capillary. The remaining parameters, such as dynamic viscosity and pressure difference are given with an existing pane arrangement. Halving the inner capillary radius results, according to Hagen-Poiseuille, in a 16-fold lower volume flow. The length of the capillary is inversely proportional to the volume flow. Halving the length of the capillary thus results in a doubling of the volume flow.

The volume flow entering the glazing interior should be greatly limited, since moisture entry also accompanies air entry. In the event of a sudden entry of large amounts of moisture, it may not be absorbed sufficiently quickly by a desiccant present in the interpane space or the spacer. The diameter of capillary tubes cannot be made arbitrarily small due to the increasingly complex production process. According to structures known in the prior art, this problem is solved by limiting the volume flow by using capillary tubes of long length (for example, 60 cm). The integration of capillaries of long length is, however, difficult. On the one hand, parts of the capillary should not be visible in the inner interpane space for reasons of visually appealing design. On the other hand, a capillary protruding into the outer interpane space hinders the edge sealing of the insulating glazing which is usually automated in the industrial production process. Moreover, the use of capillaries is problematic in terms of lack of water drop tightness. As soon as the end of the capillary facing the environment comes into contact with liquid water, it is sucked through the capillary into the interspace between the panes due to the capillary effect. The use of a capillary alone thus provides no adequate protection against larger amounts of moisture in the glazing interior and is also difficult to integrate into the production process. Reducing water vapor diffusion by using long capillary lengths is ruled out for the reasons mentioned.

The inventors found that the combination of a capillary and a membrane in a pressure equalization body significantly improves the introduction of moisture into the inner interpane space. The membrane is crucial for limiting the air volume flow and ensuring water drop tightness, while water vapor diffusion is determined by the diameter of the capillary. This synergetic effect of a capillary and a membrane yields a significant improvement of the long-term stability and service life of the glazing.

The pressure equalization body has an inner surface and an outer surface. The outer surface is oriented in the direction of the environment (atmosphere), while the inner surface adjacent the spacer or the pressure equalization body with the inner surface is introduced into the spacer. The inner surface is oriented in the direction of the inner interpane space.

The capillary has multiple sections, which can have the same inner diameter or even different inner diameters. The maximum capillary diameter of 1.2 mm applies to at least one capillary section. The individual sections of the capillary can be directly adjacent one another or only indirectly connected via the membrane.

In a possible embodiment of the invention, the inner diameter of the capillary is not constant over the individual capillary sections. The inventors have determined that a small inner diameter is not required over the entire length of the capillary. The production effort for producing a capillary or a capillary bore increases sharply as the inner diameter becomes smaller. In order to reduce this effort and, thus, also the production costs, the inner diameter does not drop below 1.2 mm or less in all sections of the capillary, but does so in at least one section of the capillary. Preferably, the average inner diameter of the capillary per milliliter of capillary depth is less than or equal to 1.2 mm. The calculation of the average inner diameter of the capillary per millimeter of capillary depth is illustrated in the following table. The total length of the capillary is the sum of the lengths of the individual capillary sections. The average diameter of the capillary is calculated from the individual inner diameters of the capillary sections, which are weighted over the length of the sections.

TABLE 1

| Capillary sections | Length | Diameter |
|---|---|---|
| 1 | 2.0 mm | 1.50 mm |
| 2 | 2.0 mm | 0.25 mm |

TABLE 1-continued

| | | |
|---|---|---|
| 3 | 2.0 mm | 0.25 mm |
| 4 | 1.0 mm | 1.80 mm |
| | Total length | Average diameter |
| As a whole | 7.0 mm | 0.83 mm |

With regard to the production effort, it suffices to expand the capillary diameter to a maximum of 2.0 mm. Beyond that, there is no further significant reduction of the production effort. Preferably, the capillary sections with the smallest diameter are arranged adjacent the membrane. Thus, the air volume flow in the immediate vicinity of the membrane is controlled. Furthermore, the sections with a larger inner diameter located at the outer and inner surface of the pressure equalization body have weaker capillarity, since the capillary rise of a liquid in a capillary is inversely proportional to the capillary radius. This is advantageous in terms of protection against water drops.

Preferably, at least a first section of the capillary is positioned between the membrane and the inner interpane space. As a result, this part of the capillary is protected against water drops such that any water situated on the outer surface of the pressure equalization body cannot pass through the capillary into the inner interpane space.

In a first preferred embodiment, a second section of the capillary is positioned between the membrane and the surrounding atmosphere. Here, the membrane is arranged between at least one first capillary section and at least one second capillary section. The membrane protects the inner interpane space against entry of liquid water and is itself also protected against mechanical influences by its arrangement in the interior of the pressure equalization body. In the case of a membrane on one of the surfaces of the pressure equalization body, it can easily be damaged during the production process or during insertion of the pressure equalization body into the spacer. On the other hand, a membrane situated in the interior of the pressure equalization body is optimally protected.

In a particularly advantageous embodiment of the invention, the membrane is fixed in its installed state in the interior of the pressure equalization body. In order to place the membrane in the interior of the pressure equalization body, an at least two-part pressure equalization body is preferably used. This comprises an outer sleeve, into which the membrane is inserted. At least a first section of the capillary is inserted into the sleeve and extends between the membrane and the inner surface of the pressure equalization body. A plug-on part that includes at least one second capillary section is placed on the membrane. The membrane is fixed between the sleeve and the plug-on part via an adhesive connection or by clamping action. The plug-on part can be glued, screwed, or pressed into the sleeve or inserted via a clip connection. If an adhesive or a clip connection is selected, the membrane is preferably glued in order to ensure sufficient tightness and to direct the volume flow completely through the capillary. In the case of fixing of the membrane via a screw connection, the plug-on part can be screwed into the sleeve or onto the sleeve. The membrane is clamped in via the screw connection, with further sealing at the edges of the membrane unnecessary. However, in this case as well, an adhesive connection can additionally be provided. Such an embodiment, in which the membrane is fixed at its insulation site, is also advantageous in terms of the use of standardized starting materials. With the structure described, membrane materials in the form of layers, which are commercially available in many forms and variants as roll goods, can be used.

In another embodiment according to the invention, the membrane is movably mounted in the pressure equalization body. The pressure equalization body includes a hollow space, in which a membrane is movably mounted. In this embodiment, the membrane is implemented as a three-dimensional membrane body, for example, spherical or cylindrical. In this embodiment as well, a two-part embodiment of the pressure equalization body comprising a sleeve and a plug-on part can also be used. The capillary sections in the sleeve and the plug-on part can be designed as already described. A hollow space including the membrane body, e.g., a spherical membrane, is situated between the capillary sections of the sleeve and of the plug-on part. In the installed state, the hollow space is connected to the inner interpane space via the capillary in the sleeve and makes contact with the ambient air via the capillary of the plug-on part. The air exchange between the inner interpane space and the environment occurs exclusively via the hollow space. Depending on the pressure situation, the membrane is pressed within the hollow space against the end of the hollow space adjacent the interpane space or the environment. As a result, in the pressurized state, the membrane rests in the region of one of the capillary ends that opens into the hollow space and seals it such that the air exchange occurs completely through the membrane. The membrane is preferably dimensioned such that the diameter of the membrane body corresponds substantially to the diameter of the hollow space and thus the membrane already touches the wall of the hollow space in the non-pressurized state. Preferably, sealing areas that serve to hold the membrane body are formed at the ends of the hollow space that are adjacent the capillary ends. The shape of the sealing areas is matched to the shape of the membrane. Thus, in the pressurized state, the best possible sealing between the membrane and the hollow space is achieved, as a result of which a volume flow passing by the membrane body is prevented. The sealing regions can be implemented, for example, as funnel-shaped sections of the hollow space, with the end of the funnel with a thinner diameter opening into the respective capillary section. An embodiment with a movably mounted membrane can be advantageous in terms of simplified production of the pressure equalization body. With a movably mounted membrane, the manufacturing tolerances of the components can be advantageously increased.

One of the two-part embodiments of the pressure equalization body described, in which the membrane is provided in the interior of the pressure equalization body, is also advantageous in terms of production costs. Production costs depend, among other things, on the length and the diameter of the capillary, for example, a capillary bore. In the case of a two-part embodiment, the length of the capillary bore to be drilled in one piece is significantly reduced. In this embodiment, the sleeve and the plug-on part can be drilled independently of one another. This applies to all of the two-part embodiments described that have an internal membrane.

In a second preferred embodiment, the membrane is attached to the outer surface of the pressure equalization body. In this embodiment, all sections of the capillary are located between the membrane and the inner surface of the pressure equalization body. This has the advantage that all sections of the capillary are protected against liquid water since water drops roll off the membrane. Furthermore, such a pressure equalization body is simple and economical to produce since no multi-part production is necessary; but, instead, a monolithic main body can be used. The membrane can, for example, be mounted on the outer surface via an adhesive connection or a clamping connection. Both screw connections and clip connections can be considered as clamping connections, with screw connections preferred due to their greater stability. An example of suitable screw connections to be mentioned here is a threaded ring that is placed on the membrane and is screwed to an outside thread of the monolithic main body. An adhesive connection also has high stability and is, for example, advantageous to ensure production that is as simple as possible and that can be automated.

In a third preferred embodiment, the membrane can also be applied on the inner surface of the pressure equalization body. Here, the advantages and embodiment details mentioned for the second embodiment apply essentially. In the case of the third embodiment, the capillary is not protected against water drops; however, after assembly, the membrane is protected against damage to the outer surface.

The capillary can be implemented either in the form of a bore or as an inserted capillary tube. A bore is advantageous since it can be introduced very precisely into the pressure equalization body and no sealing between the pressure equalization capillary tube has to occur. Also, capillaries with a variable diameter can be produced in the form of a bore. Otherwise, in order to obtain a variable diameter, multiple capillary tubes of different diameters would have to be inserted one behind another into the pressure equalization body, which proves to be relatively complicated. If the diameter of the capillary is constant along a component, a capillary tube can be introduced instead of a capillary bore. This is suitable in particular in the case of a monolithic main body. Alternatively, it is also possible, in a multi-part pressure equalization body, to introduce a capillary tube into the sleeve and into the plug-on part in each case, with both possibly having a different inner diameter. As already discussed, bores with very small diameters in the capillary range have proved to be complicated and thus also costly. Capillary tubes with suitable inner diameters are, on the other hand, economically available commercially. The outer diameter of the capillary tubes is usually more than 1.5 mm, for example, 1.8 mm outer diameter with 0.25 mm inner diameter of a capillary tube. Consequently, a bore with the outer diameter of the capillary tube is introduced into the corresponding component of the pressure equalization body, and the capillary tube is pushed into this bore. The transition between the capillary tube and the pressure equalization body is preferably sealed at the outer surface and the inner surface.

The capillary bore itself and the bore opening for inserting a capillary tube can be produced by means of mechanical machining techniques known to the person skilled in the art. Particularly, in the case of bores with small diameters, for example, with bore diameters less than or equal to 1.2 mm, the bore can even be produced by laser. This is particularly advantageous due to the high precision of these methods.

In a preferred embodiment, the pressure equalization body is manufactured in multiple parts from a sleeve and a plug-on part, wherein the sleeve and the plug-on part include a capillary in the form of a bore.

In another preferred embodiment, the pressure equalization body comprises a monolithic main body, into which a capillary tube is inserted.

Preferably, the capillary has, in at least one section, an inner diameter less than or equal to 0.80 mm, preferably less than or equal to 0.60 mm, particularly preferably less than or equal to 0.50 mm. In particular, inner diameters of 0.20 mm to 0.40 mm, for example, 0.25 mm, 0.30 mm, or 0.40 mm have proved to be particularly suitable. The smaller the diameter of the capillary, the higher the resistance to water vapor diffusion. However, as the diameter of the capillary decreases, the production costs increase. A capillary diameter of approx. 0.40 mm has proved quite suitable with regard to both problems.

The membrane of the pressure equalization body is watertight and water vapor permeable.

In a preferred embodiment of the pressure equalization body, on at least one of the capillary sections adjacent the membrane, a recess is made, whose diameter is greater than the inner diameter of the capillary. In the region of the recess, the diameter of the capillary is widened to ensure free movability of the membrane. Particularly in the case of small diameters of the adjacent capillary in combination with high pressure differences between the glazing interior and the atmosphere, membrane material can be sucked into the adjacent capillary sections. This restricts free oscillation of the membrane and influences the process of diffusion through the membrane. When a recess is provided on at least one of the ends of capillary adjacent the membrane, this can be prevented. The free oscillation of the membrane causes the build-up of a pressure cushion in the vicinity of the membrane, which advantageously enables uniform air volume flow through the membrane.

The recess preferably has a diameter between 1.2 mm and 5.0 mm, particularly preferably between 1.2 mm and 2.5 mm, in particular between 1.5 mm and 2.0 mm. The depth of the recess is between 0.1 mm and 1.0 mm, preferably between 0.1 mm and 0.5 mm, particularly preferably between 0.15 mm and 0.3 mm. A recess with these dimensions enables free oscillation of the membrane and particularly uniform air volume flow.

The membrane can include a variety of sintered or unsintered polymers, for example, polypropylene, polyesters, polyamide, polyether, polytetrafluoroethylene, polysulfone, ethylene-tetrafluoroethylene copolymer, fluorinated ethylenepropylene, tetrafluoroethylene/perfluoro(polyvinyl) ether copolymer, and/or mixtures and copolymers thereof. Halogen-containing polymers are advantageous in terms of their water-repellent properties.

Particularly preferably, the membrane contains at least one polymer from the group of polyhalo-olefins, preferably polychlorotrifluoroethylene, polyvinylidene fluoride, polytetrafluoroethylene, and/or copolymers or mixtures thereof. These materials are particularly advantageous since they have a hydrophobic surface on which water drops roll off.

In a particularly preferred embodiment, the membrane includes polytetrafluoroethylene (PTFE). PTFE is both chemically inert and thermally resistant, as a result of which it has high aging resistance.

The polymeric membranes mentioned can be expanded (stretched) or sintered; preferably the membrane is sintered. For producing expanded membranes, the base material is stretched by pulling at the edges of a layer of material. Membrane pieces corresponding to the desired application are then cut from this expanded stretched material layer. With expanded membranes, the pore size and pore shape of an individual piece of material depends on the region of the stretched material layer from which the fragment was cut. A piece of membrane from the edge region of the layer of material tends to have larger elongated pores, whereas a fragment from the central region has substantially smaller pores. Sintered membranes have, in contrast, a very uniform pore size, which can be controlled quite well.

In the context of the invention, both expanded and sintered membranes can be used. Sintered membranes are preferred due to the advantages mentioned.

The membrane preferably includes sintered PTFE.

In another possible embodiment, the membrane is a ceramic membrane with a metallic support structure. This preferably includes aluminum and/or titanium as the support structure, wherein a porous ceramic metal is applied to one surface of the metal and, on the opposite side of the support, the metal is removed in defined regions by electrochemical processes. In the regions in which the metal layer is removed, the porous metal oxide layer is accessible from both sides of the support structure, and gases diffuse through the membrane.

The membrane preferably has water vapor permeability of more than 50 g/(day m$^2$) and less than 400 g/(day m$^2$) measured per the ASTM E96-10 method. The membrane preferably has water vapor permeability measured per the ASTM E96-10 method of more than 70 g/(day m$^2$) and less than 350 g/(day m$^2$), more preferably of more than 100 g/(day m$^2$) and less than 300 g/(day m$^2$), even more preferably of more than 120 g/(day m$^2$) and less than 250 g/(day m$^2$).

As already mentioned, the need to use capillaries of great length is eliminated by means of the pressure equalization body according to the invention. Preferably, the total length of the capillary (sum of the length of capillary sections) is less than or equal to 6.0 cm. It was found that a capillary length less than or equal to 2.0 cm, in combination according to the invention with a membrane, already suffices to achieve a very good result in terms of minimization of the moisture appearing in the inner interpane space. Usually, even a capillary length less than or equal to 1.0 cm suffices. The capillary lengths usually used in the pressure equalization body according to the invention are between 0.4 cm and 1.0 cm, for example, approx. 6 mm. The shortest possible length of the capillary is advantageous in terms of a simple and visually inconspicuous integration of the pressure equalization body into the edge seal of the pane.

The height of the pressure equalization body, measured between the inner surface and the outer surface of the pressure equalization body, is essentially determined by the capillary length desired. The pressure equalization body preferably has a height less than or equal to 2.0 cm, particularly preferably less than or equal to 1.0 cm, in particular 0.4 cm to 1.0 cm, for example, approx. 8 mm.

A wide variety of spacers known to the person skilled in the art can be used as spacers of the insulating glazing according to the invention, since the solution according to the invention is compatible with any spacers.

The pressure equalization body is introduced into the outer surface of the spacer via a screw connection, a clip connection, or an adhesive connection. The pressure equalization body can also be pressed with the spacer.

In a possible embodiment, the insulating glazing according to the invention has a spacer with a polymeric or metallic main body including at least one hollow chamber. A suitable spacer with a polymeric main body is disclosed, for example, in WO 2013/104507 A1.

Hollow profile spacers known to the person skilled in the art contain at least one hollow chamber in a usually polymeric or metallic main body. The hollow chamber is adjacent the glazing interior surface, with the glazing interior surface situated above the hollow chamber and the outer surface of the spacer situated below the hollow chamber. In this context, "above" is defined as facing the inner interpane space of the insulating glazing and "below" as facing away from the pane interior.

The hollow chamber of the spacer of the insulating glazing according to the invention yields a weight reduction compared to a solidly formed spacer and is available to hold further components, such as a desiccant.

Preferably, the pressure equalization body is inserted in the outer surface of the spacer via an opening and opens into the hollow chamber. The opening can, for example, be implemented in the form of a bore hole. The air entering via the pressure equalization body is thus first routed into the hollow chamber. Preferably, a desiccant is introduced into the hollow chamber such that possible residual moisture is immediately removed from the air flowing into the hollow chamber.

In another possible embodiment, the pressure equalization body is likewise inserted on the outer surface of the spacer and protrudes through the spacer all the way to the glazing interior surface. This embodiment is advantageous in order to increase the length of the capillary with the same space requirement for the entire arrangement. Preferably, the pressure equalization body and the capillary of the pressure equalization body do not protrude into the inner interpane space in order not to interfere with the appearance of the insulating glazing.

A pressure equalization body protruding through the spacer all the way to the glazing interior surface is also preferably used for spacers that do not have a hollow chamber.

In an alternative embodiment, the capillary of the pressure equalization body can also protrude into the inner interpane space. In this case, the capillary preferably protrudes at most 1.0 cm into the inner interpane space in order not to adversely affect the visually appealing appearance of the glazing.

The pressure equalization body preferably contains a narrowing in the vicinity of its inner surface. In the region of the narrowing, the outer diameter of the pressure equalization body is smaller than in the remaining region of the pressure equalization body. The pressure equalization body is inserted into the opening on the outer surface of the spacer via this narrowing. This is advantageous because a seal between the spacer and the pressure equalization body can easily be produced at the point of the narrowing. Sealing materials considered here are the sealants mentioned for gluing the panes to the first and second pane contact surface of the spacer.

The glazing interior surface of the hollow profile spacer includes at least one permeable region, which connects the hollow chamber gas-permeably to the inner interpane space. The air flowing into the hollow chamber via the pressure equalization body can enter the inner interpane space in this permeable region. The permeable region can either be made of a gas-permeable material or can also contain air inlets in the form of openings.

In a preferred embodiment of the hollow body spacer, the glazing interior surface has at least one air inlet. Preferably, multiple air inlets are made in the glazing interior surface. The total number of air inlets depends on the size of the insulating glazing. The air inlets connect the hollow chamber to the inner interpane space, making a gas exchange between them possible. This allows absorption of atmospheric humidity by the desiccant situated in the hollow chamber and thus prevents fogging of the panes. The air inlets are preferably implemented as slits, particularly preferably as slits with a width of 0.2 mm and a length of 2 mm.

The slits ensure optimum air exchange without desiccant from the hollow chamber being able to penetrate into the inner interpane space.

In another possible embodiment, the insulating glazing according to the invention contains an injectable thermoplastic spacer made of a sealing material. Such spacers are known, for example, from DE 696 07 473 and WO 2015/197491 A1. In this case, in the absence of a hollow chamber, the pressure equalization body can be introduced into the spacer such that the inner surface of the pressure equalization body protrudes into the spacer all the way to the glazing interior surface.

In both embodiments of the spacer mentioned, the desiccant preferably contains silica gels, molecular sieves, $CaCl_2$, $Na_2SO_4$, activated carbon, silicates, bentonites, zeolites, and/or mixtures thereof. This is advantageous since the residual moisture present in the inner interpane space can thus be bound. The desiccant is preferably incorporated into the main body of the spacer. In the case of sprayable thermoplastic spacers, the desiccant is usually integrated in the sprayable sealing material. In the case of hollow body spacers, the desiccant is preferably situated in the hollow chamber of the main body.

In a preferred embodiment, the pressure equalization body includes metals or gas-tight plastics, preferably aluminum, stainless steel, polyethylene vinyl alcohol (EVOH), low-density polyethylene (LDPE), and/or biaxially oriented polypropylene film (BOPP).

Multi-part pressure equalization bodies comprising a sleeve and a plug-on part are preferably made of metallic materials, particularly preferably of aluminum or stainless steel. Metals have, in this respect, advantageous stability and good machinability as well as the required gas-tightness.

When the pressure equalization body is provided as a monolithic component, preferably used are plastics, particularly preferably polyethylene vinyl alcohol. The use of plastic materials enables economical production in large quantities. Since plastics are usually not gas-tight, further measures can be taken in this regard as necessary. A capillary tube inserted into the plastic body can be made of a metal (e.g., stainless steel) to remedy this. Furthermore, the outer surface of the pressure equalization body can be sealed in the region outside the capillary opening. However, this is not absolutely necessary since, depending on the material of the component, diffusion through the plastic body is negligible compared to the flow through the capillary.

In a preferred embodiment, the spacer is a metallic hollow profile spacer. This has the advantage that metallic spacers are gas-tight and no barrier films are required to seal the outer surface of the spacer.

In another preferred embodiment of the hollow profile spacer, it includes a polymeric main body. This is advantageous since the thermal conductivity of plastics is significantly lower than the thermal conductivity of metals. Preferably, a gas- and vapor-tight barrier is applied at least on the outer surface of the spacer, preferably on the outer surface and on part of the pane contact surfaces. The gas- and vapor-tight barrier improves the tightness of the spacer against gas loss and moisture penetration. Preferably, the barrier is applied to approx. half to two thirds of the pane contact surfaces.

In a preferred embodiment, the insulating glazing according to the invention is at least a triple glazing, wherein a further pane is attached to the first and/or the second pane via a further spacer.

Particularly preferably, double spacers can also be used for triple glazings, in which the third pane is, for example, inserted into a groove between the first pane and the second pane. Such spacers, are known from WO 2014/198431 A1, among others. Preferably, a pane made of non-tempered glass with a so-called "low-E coating" is inserted in the groove of the spacer.

In the context of the invention, "non-tempered" refers to a pane that has been subjected to neither a thermal nor a chemical tempering process. Such processes are well known to the person skilled in the art.

Applying low-E coatings to one of the panes of an insulating glazing can increase and improve the thermal insulation capacity of the insulating glazing even further. So-called low-E coatings offer an effective possibility for shielding against infrared radiation already before it enters the living area and, at the same time, letting daylight through. Low-E coatings are thermal radiation reflecting coatings that reflect a significant portion of infrared radiation, resulting in reduced heating of the living area in the summer. A wide variety of low-E coatings are known, for example, from DE 10 2009 006 062 A1, WO 2007/101964 A1, EP 0 912 455 B1, DE 199 27 683 C1, EP 1 218 307 B1, and EP 1 917 222 B1. Such low-E coatings cause the pane to heat up with exposure to sunlight, resulting in expansion of the pane and associated additional stresses. To compensate for these stresses, the center pane of a prior art insulating glazing is often tempered. With the use of double spacers in which the third pane is introduced stress-free in a groove, stresses can be reduced such that, in this case, tempering of the center pane can be dispensed with completely.

Multiple pressure equalization bodies can be installed in one glazing. Depending on the size of the insulating glazing, the volume flow entering or exiting through a single pressure equalization body is inadequate for sufficiently fast pressure equalization. In this case, two or more pressure equalization bodies are provided within the spacer of the insulating glazing. The person skilled in the art can determine by simple experiments whether one pressure equalization body is adequate or whether a plurality must be provided.

The pressure equalization body according to the invention is preferably mounted in the spacer of the insulating glazing such that, in the installed position of the glazing in the building, it is mounted in the upper third of the glazing. In addition, the pressure equalization body is preferably mounted on an outer surface of the spacer, which surface is arranged vertically in the installed position. Both measures serve to prevent accumulation of moisture in the region of the pressure equalization body.

If the insulating glazing is a triple or multiple glazing, a pressure equalization body can be provided for each interpane space. Alternatively, one pressure equalization body is adequate for multiple interpane spaces provided that communicating interpane spaces are provided. This can be achieved, for example, by an opening in the center pane or also by a communicating connection within a triple spacer.

The insulating glazing according to the invention is particularly suitable for holding fixtures in the interpane space. Particularly in the case of movable fixtures, such as blinds, concave deformation of the pane due to climate loads prevents the function of these fixtures. Inner pane surfaces can even be damaged by a sliding blind. In addition, insulating glazings with blinds have a comparatively higher gas volume since the interpane space accommodating the blind usually has a width of at least 27 mm. In light of this, pressure equalization is particularly important for insulating glazings with fixtures in one of the interpane spaces. By means of pressure equalization between the interpane space and the atmosphere, the pressure equalization body according to the invention enables error-free functioning of the fixtures.

The first pane and/or the second pane of the insulating glazing preferably contain glass, particularly preferably quartz glass, borosilicate glass, soda lime glass, and/or mixtures thereof. The first and/or second pane of the insulating glazing can also include thermoplastic polymer panes. Thermoplastic polymer panes preferably include polycarbonate, polymethyl methacrylate, and/or copolymers and/or mixtures thereof. Additional panes of the insulating glazing can have the same composition as mentioned for the first pane and the second pane.

The first pane and the second pane have a thickness of 2 mm to 50 mm, preferably 2 mm to 10 mm, particularly preferably 4 mm to 6 mm, with the two panes also possibly having different thicknesses.

The outer interpane space, delimited by the first pane, the second pane, and the outer surface of the spacer, is at least partially, preferably completely, filled with an outer seal. Very good mechanical stabilization of the edge seal is achieved as a result. In addition, the seal surrounds the pressure equalization body and protects it against mechanical influences from the outside.

Preferably, the outer seal contains polymers or silane-modified polymers, particularly preferably organic polysulfides, silicones, room-temperature-vulcanizing (RTV) silicone rubber, peroxide-vulcanizing silicone rubber, and/or addition-vulcanizing silicone rubber, polyurethanes, and/or butyl rubber.

The sealant between the first pane contact surface and the first pane, or between the second pane contact surface and the second pane, preferably contains a polyisobutylene. The polyisobutylene can be a vulcanizing or a non-vulcanizing polyisobutylene.

In a preferred embodiment, the gas- and vapor-tight barrier on the outer surface of a polymeric spacer is implemented as a film. This barrier film contains at least one polymeric layer as well as a metallic layer or a ceramic layer. The layer thickness of the polymeric layer is between 5 µm and 80 µm, while metallic layers and/or ceramic layers with a thickness of 10 nm to 200 nm are used. Within the layer thicknesses mentioned, particularly good tightness of the barrier film is achieved. The barrier film can be applied on the polymeric main body, for example, glued. Alternatively, the film can be coextruded together with the main body.

Particularly preferably, the barrier film contains at least two metallic layers and/or ceramic layers, which are arranged alternatingly with at least one polymeric layer. The layer thicknesses of the individual layers are preferably as described in the previous paragraph. Preferably, the outward layers are formed by the polymeric layer. In this arrangement, the metallic layers are particularly well protected against damage. The alternating layers of the barrier film can be bonded or applied on one another in a wide variety of methods known in the prior art. Methods for depositing metallic or ceramic layers are well known to the person skilled in the art. The use of a barrier film with an alternating layer sequence is particularly advantageous in terms of the tightness of the system. A defect in one of the layers does not result in a loss of function of the barrier film. By comparison, in the case of a single layer, a small defect can lead to complete failure. Furthermore, the application of multiple thin layers is advantageous in comparison with one thick layer since the risk of internal adhesion problems increases with increasing layer thickness. In addition, thicker layers have higher conductivity such that such a film is less suitable thermodynamically.

The polymeric layer of the film preferably includes polyethylene terephthalate, ethylene vinyl alcohol, polyvinylidene chloride, polyamides, polyethylene, polypropylene, silicones, acrylonitriles, polyacrylate, polymethyl acrylate, and/or copolymers or mixtures thereof. The metallic layer preferably contains iron, aluminum, silver, copper, gold, chromium, and/or alloys or oxides thereof. The ceramic layer of the film preferably contains silicon oxides and/or silicon nitrides.

In an alternative preferred embodiment, the gas- and vapor-tight barrier is preferably implemented as a coating. The coating contains aluminum, aluminum oxides and/or silicon oxides and is preferably applied by a PVD method (physical vapor deposition). This can considerably simplify the production method since the polymeric main body is provided with the barrier coating directly after production, for example, by extrusion, and no separate step is necessary for applying a film. The coating with the materials mentioned provides particularly good results in terms of tightness and, additionally, has excellent adhesion properties to the materials of the outer seal used in insulating glazings.

In a particularly preferred embodiment, the gas- and vapor-tight barrier has at least one metallic layer or ceramic layer, which is implemented as a coating and contains aluminum, aluminum oxides and/or silicon oxides and preferably is applied by a PVD method (physical vapor deposition).

Preferably, the spacer is a hollow profile spacer with a polymeric main body.

The polymeric main body preferably contains polyethylene (PE), polycarbonate (PC), polypropylene (PP), polystyrene, polybutadiene, polynitriles, polyesters, polyurethanes, polymethyl methacrylate, polyacrylates, polyamides, polyethylene terephthalate (PET), polybutylene terephthalate (PBT), preferably acrylonitrile butadiene styrene (ABS), acrylonitrile styrene acrylester (ASA), acrylonitrile butadiene styrene/polycarbonate (ABS/PC), styrene acrylonitrile (SAN), PET/PC, PBT/PC, and/or copolymers or mixtures thereof. Particularly good results are achieved with these materials.

Preferably, the polymeric main body is glass-fiber-reinforced. Through the selection of the glass fiber content in the main body, the coefficient of thermal expansion of the main body can be varied and adapted. Through the adaptation of the coefficients of thermal expansion of the main body and of the barrier film or coating, temperature-induced tensions between the different materials and flaking of the barrier film or coating can be avoided. The main body preferably has a glass fiber content from 20% to 50%, particularly preferably from 30% to 40%. The glass fiber content in the main body improves strength and stability at the same time.

In another preferred embodiment, the polymeric main body is filled with hollow glass spheres or glass bubbles. These hollow glass bubbles have a diameter of 10 µm to 20 µm and improve the stability of the polymeric hollow profile. Suitable glass spheres are commercially available under the name "3M™ Glass Bubbles". The polymeric main body particularly preferably contains polymers, glass fibers, and glass bubbles. Addition of glass bubbles yields an improvement of the thermal properties of the hollow profile.

The insulating glazing is optionally filled with a protective gas, for example, with a noble gas, preferably argon or krypton, which reduce the heat transfer value in the interpane space of the insulating glazing. In a preferred embodiment, the insulating glazing is filled with air.

The spacer is a hollow profile spacer and optionally contains one or a plurality of partition walls. The partition walls limit the direct gas flow through the hollow chamber and enable a variation of the hollow chamber space that makes direct contact with the pressure equalization body. A gas exchange through the partition wall is impossible such that the gas flow through the pressure equalization body can pass through the hollow chamber only in one direction. Usually, the gas flow initially passes through a section of the hollow body spacer that has no air inlets and is dried by contact with the desiccant before entry into the inner interpane space. Such measures are usually not required when using the pressure equalization body according to the invention, since an adequately low moisture rate is achieved in the inner interpane space even without these complex arrangements. Despite all this, such a combination is possible to extract the remaining moisture from the incoming volume flow.

At the corners of the insulating glazing, the spacers are linked to one another preferably via corner connectors. Such corner connectors can be implemented, for example, as a molded plastic part with a seal, in which two mitered spacers abut. In principle, a large variety of geometries are possible for the insulating glazing, for example, rectangular, trapezoidal, and rounded shapes. For producing round geometries, the spacer can, for example, be bent in the heated state.

The invention further includes a method for producing an insulating glazing according to the invention at least comprising the steps
a) Providing a spacer,
b) Bonding the first pane and the second pane to the pane contact surfaces of the spacer via a sealant,
c) Pressing the pane assembly comprising the first pane, the second pane, and the spacer,
d) Filling the outer interpane space with an outer seal,
e) Creating an opening on the outer surface of the spacer, and
f) Inserting a pressure equalization body into the opening on the outer surface of the spacer.

The opening is preferably introduced in the form of a bore in the outer surface of the spacer. The opening must be created prior to the insertion of the pressure equalization body in step f); however, step e) need not immediately precede step f). The steps e) and f) can be performed either at any time before step d) or after step d).

Preferably, steps e) and f) are carried out after step d), since, in this case, the system for filling the edge region (step d)) does not have to be modified.

Alternatively, steps e) and f) occur before step b). In this case, the system for introducing the outer seal must be modified such that it detects the pressure equalization body as an obstacle and bypasses it. This is particularly useful when manufacturing large quantities.

In a preferred embodiment of the method, a sealant is arranged between the opening for inserting the pressure equalization body and the pressure equalization body itself.

The pressure equalization body is preferably provided with a reversible cover at the outer surface. The cover must be removed again before installation of the insulating glazing at the installation site to enable pressure equalization according to the invention via the pressure equalization body. The cover prevents contamination of the pressure equalization body during production and transport of the insulating glazing.

When the spacer used is a hollow profile spacer, the spacer is preferably pre-formed into a rectangle before step a). The individual spacer profiles can be provided, for example, with a miter cut and linked at the corners by corner connectors. The spacers can, instead, also be welded together directly, for example, by ultrasonic welding.

When a sprayable thermoplastic spacer is used, it is extruded from a main body containing a sealing material and a desiccant into the intermediate space between the first pane and the second pane.

The bonding of the panes to the pane contact surfaces per step b) can be carried out in any order desired. Optionally, the bonding of both panes to the pane contact surfaces can even be done simultaneously.

In a possible embodiment, the inner interpane space between the first pane and the third pane is filled with a protective gas before the pane arrangement is pressed. In another embodiment, the inner interpane space is filled with air.

In step d), the outer interpane space is at least partially, preferably completely, filled with an outer seal. Preferably used as external insulation is, for example, a plastic sealing compound. If the pressure equalization body is inserted after the filling of the outer interpane space (after step d)), the outer seal is removed in the region of the opening during creation of the opening per step e).

The invention further includes the use of the insulating glazing according to the invention in the building exterior and/or in façades.

Figure 1B:
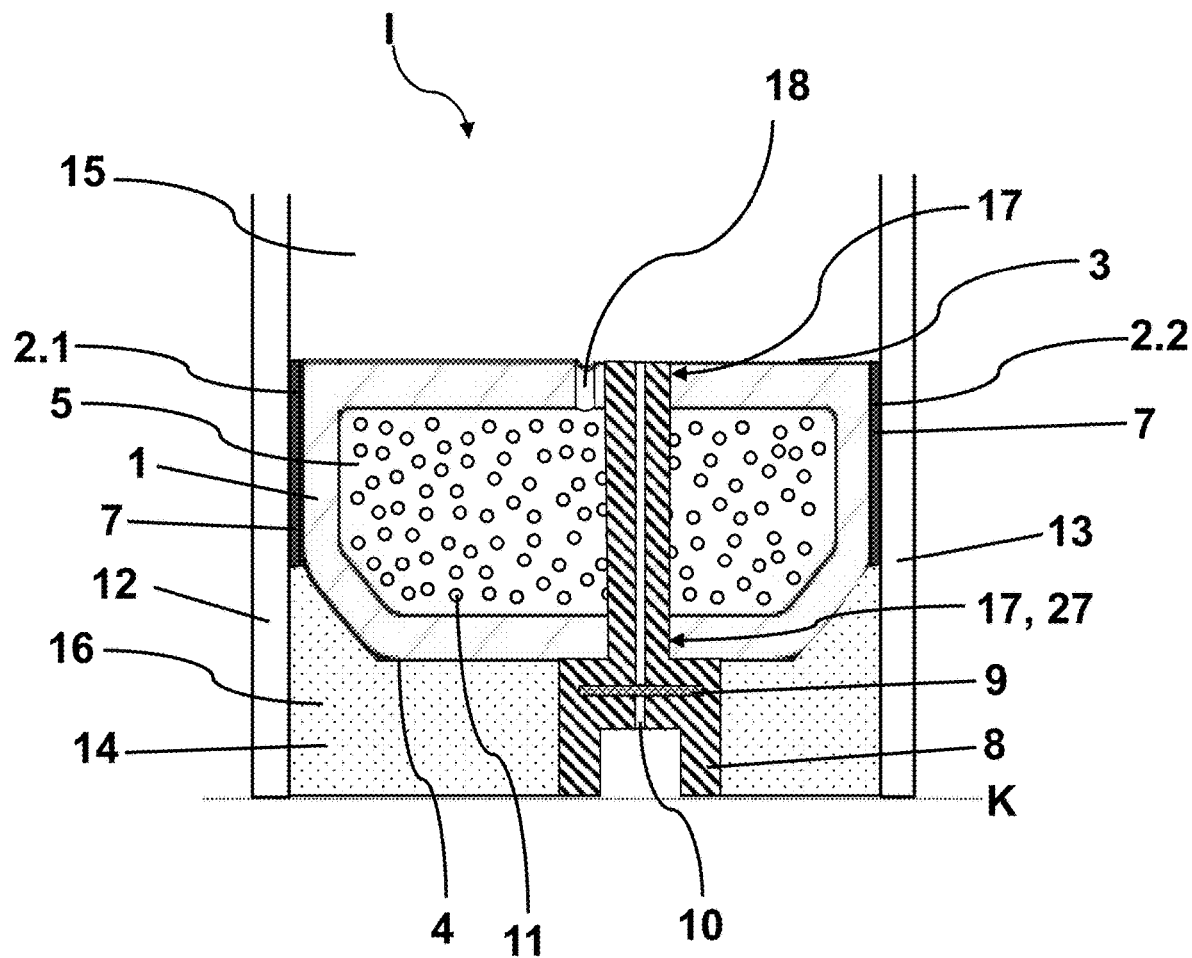
Figure 2:
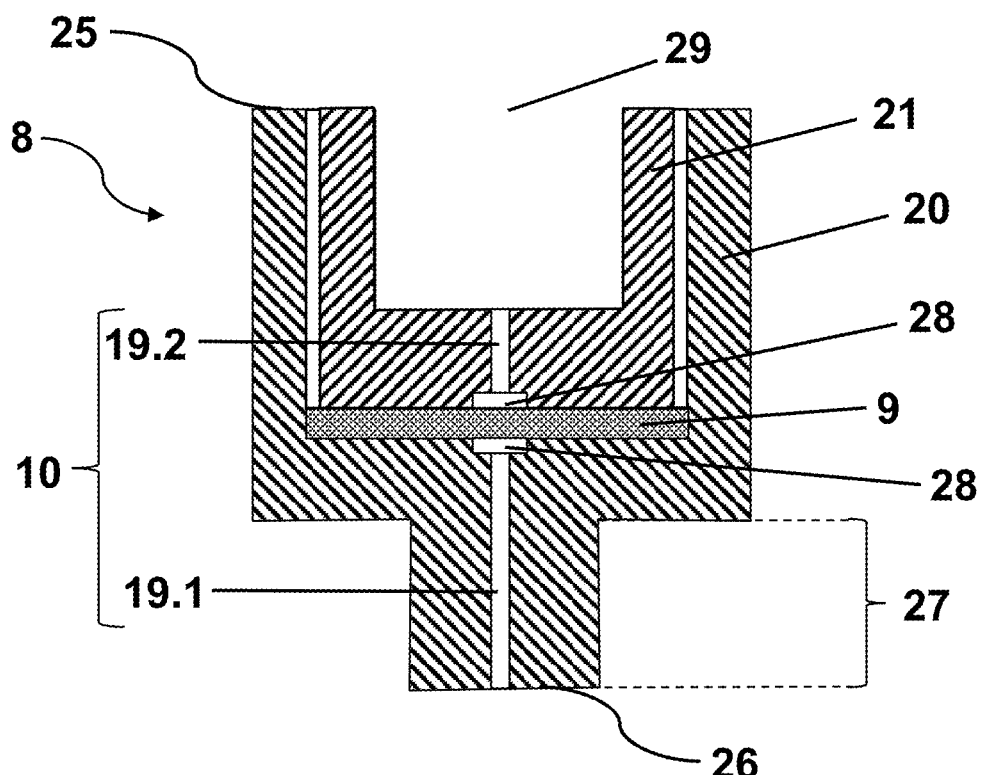
Figure 3:
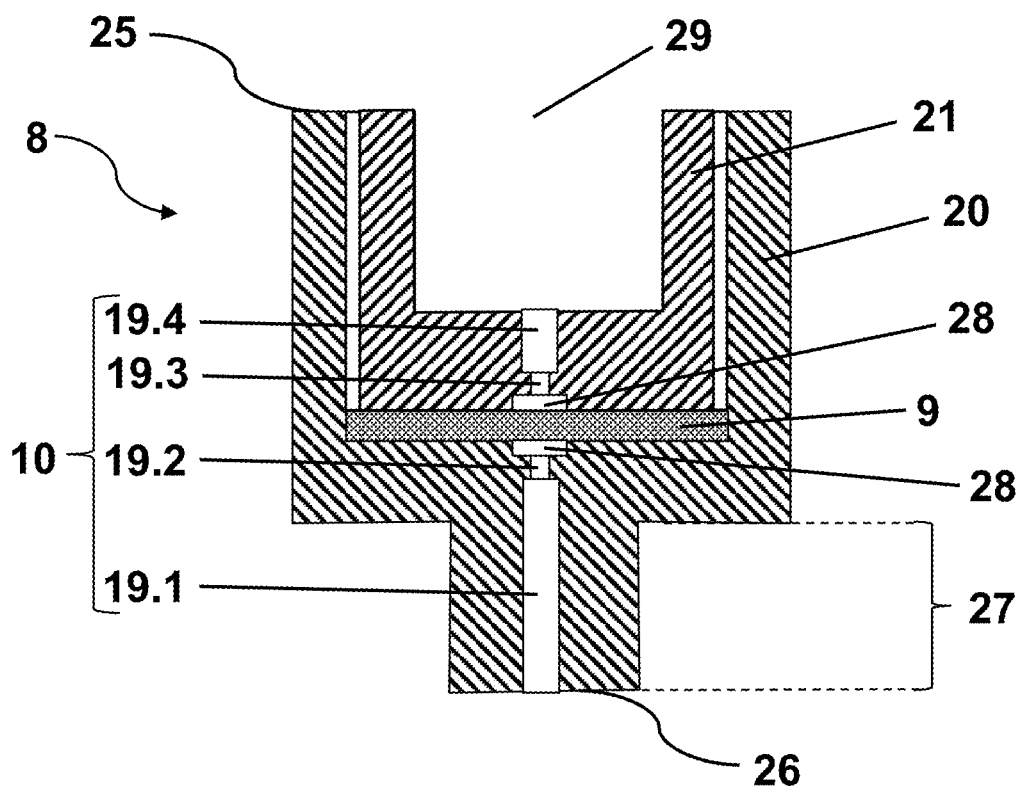
Figure 4:
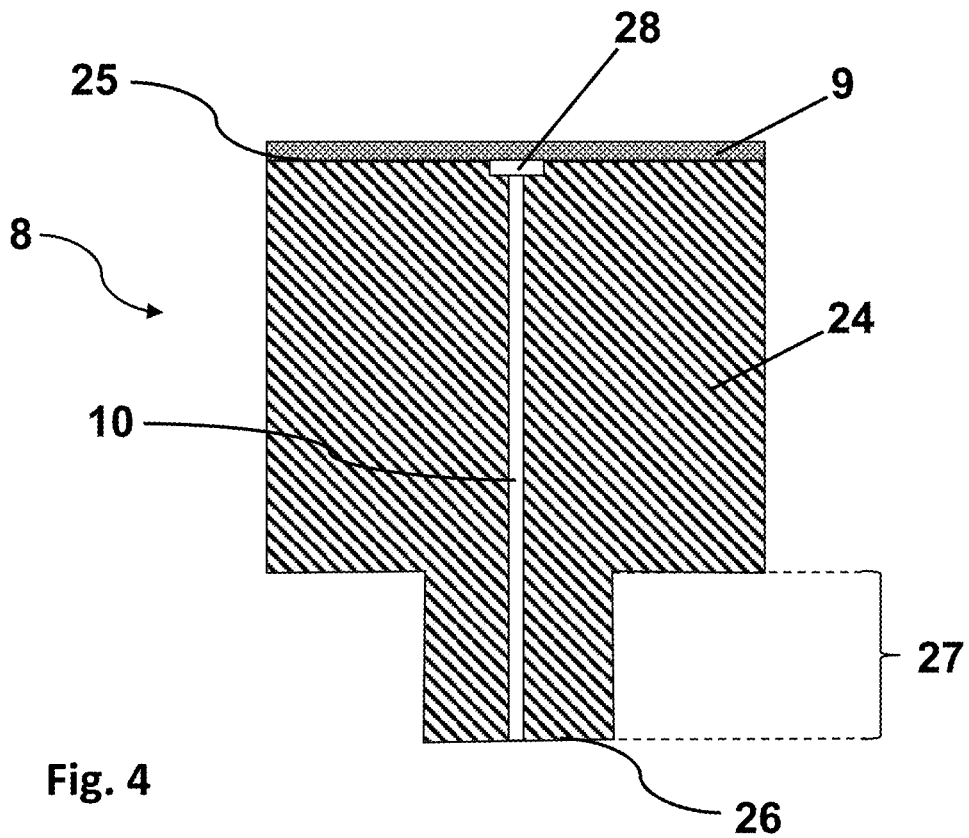
Figure 5:
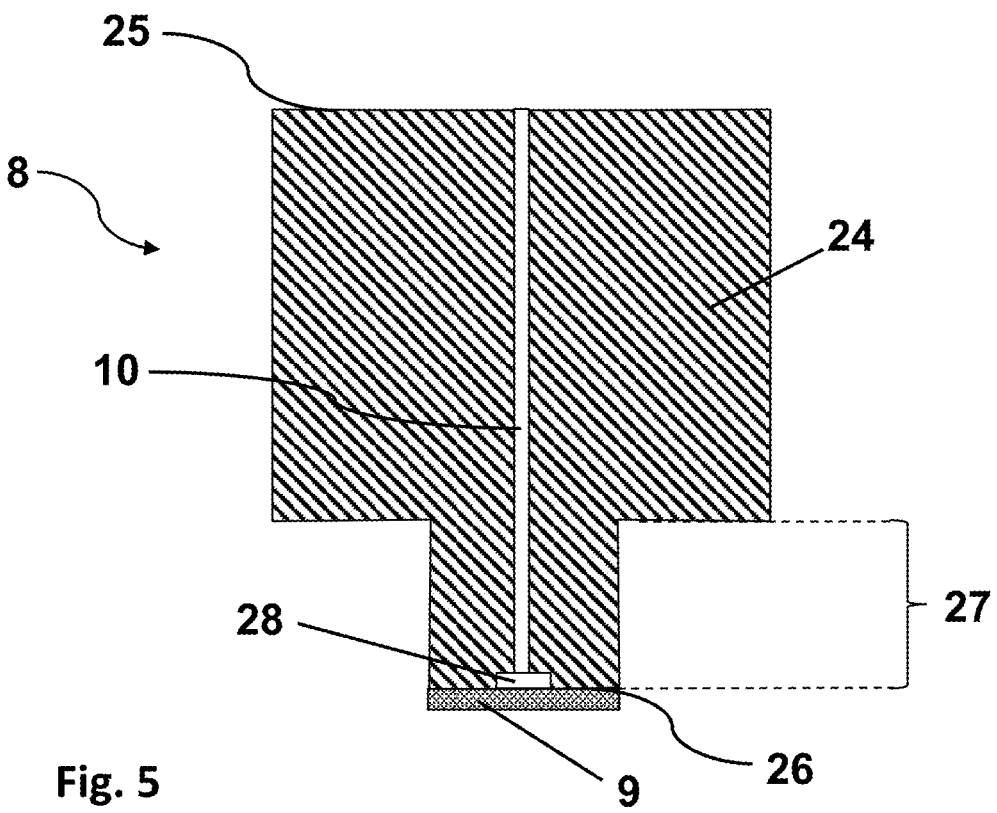
Figure 6:
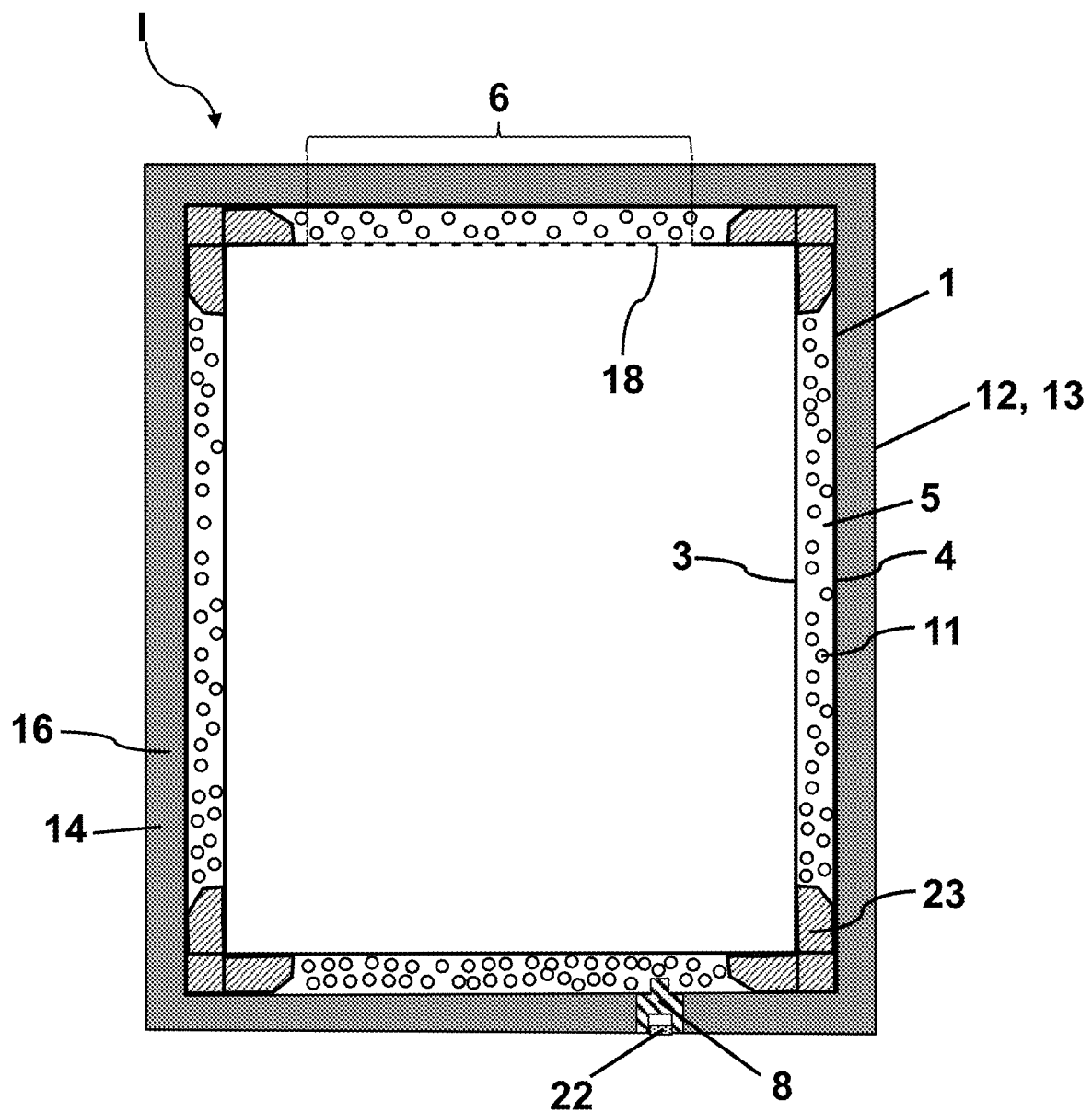
Figure 7:
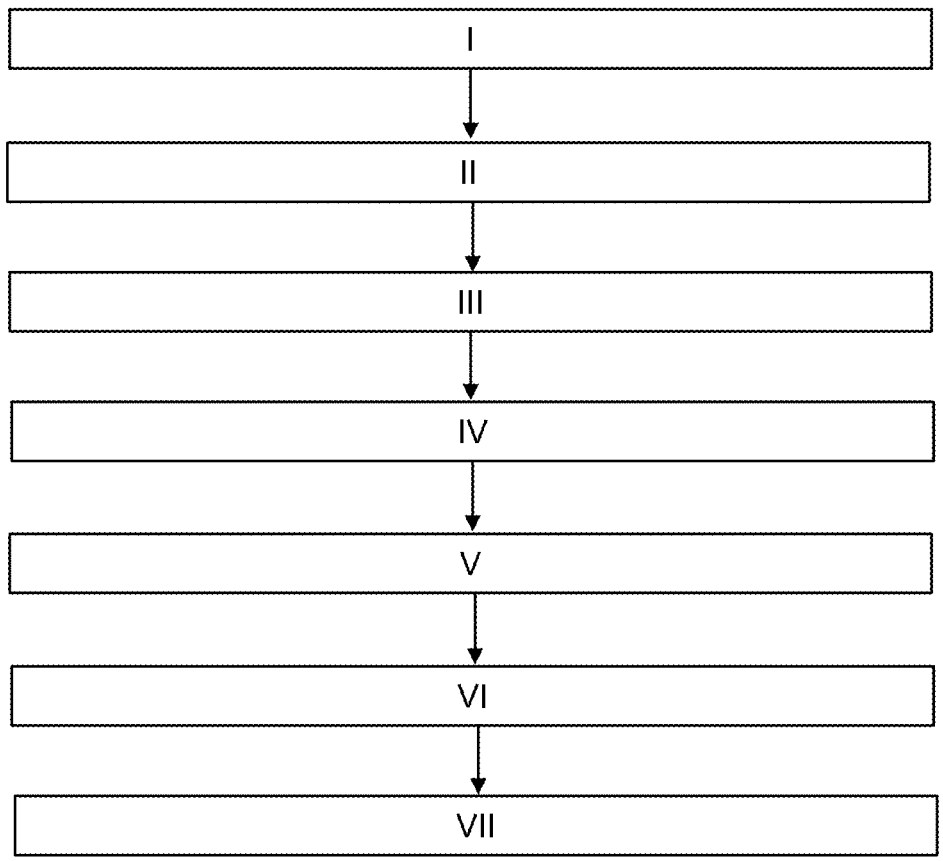
Figures 8A, 8B, 8C:
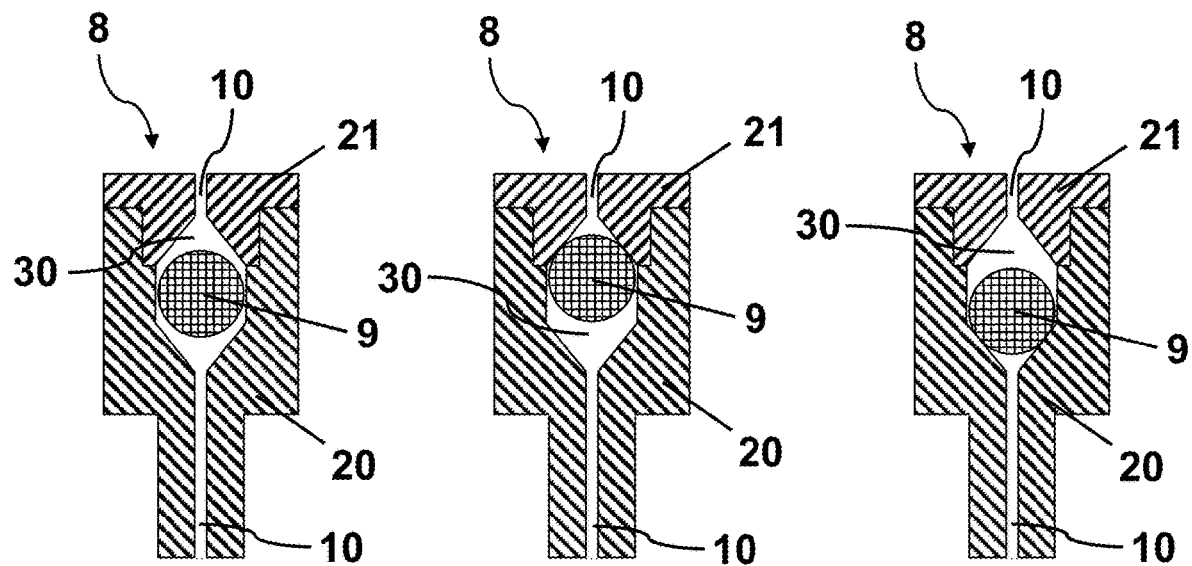
Figure 9:
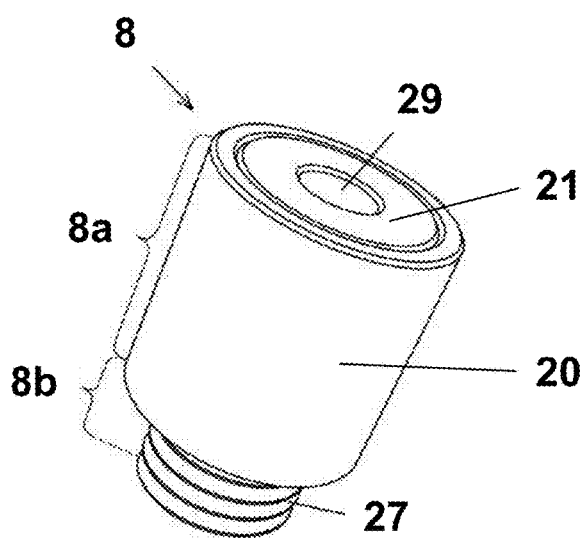

In the following, the invention is explained in detail with reference to drawings. The drawings are purely schematic representations and not to scale. They in no way restrict the invention. They depict:

FIG. 1a a cross-section of an embodiment of the insulating glazing according to the invention with a hollow profile spacer and a pressure equalization body with a capillary and a membrane, FIG. 1b a cross-section of another embodiment of the insulating glazing according to the invention with a hollow profile spacer and a pressure equalization body with a capillary and a membrane, FIG. 2 a cross-section of an embodiment of the pressure equalization body according to the invention comprising a sleeve and a plug-on part with a capillary of constant diameter and a membrane, FIG. 3 a cross-section of another possible embodiment of the pressure equalization body according to the invention comprising a sleeve and a plug-on part with a capillary of variable diameter and a membrane, FIG. 4 a cross-section of another possible embodiment of the pressure equalization body according to the invention comprising a monolithic main body with a capillary of constant diameter and a membrane on the outer surface of the pressure equalization body, FIG. 5 a cross-section of another possible embodiment of the pressure main body with a capillary of constant diameter and a membrane on the inner surface of the pressure equalization body, FIG. 6 an insulating glazing comprising a spacer frame with a pressure equalization body according to the invention and a perforated region in the glazing interior surface of the spacer, and FIG. 7 a flowchart of a possible embodiment of the method according to the invention, FIG. 8a-c another embodiment according to the invention of a pressure equalization body with a movably mounted membrane under various pressure conditions, FIG. 9 a plan view of a pressure equalization body of FIG. 2 or FIG. 3, FIG. 10*a-d* a schematic representation of the process steps during assembly of the pressure equalization body in an insulating glazing.

FIG. 1*a* depicts a cross-section of an embodiment of the insulating glazing according to the invention with a hollow profile spacer and a pressure equalization body with a capillary and a membrane. The spacer 1 comprises a first pane contact surface 2.1, a second pane contact surface 2.2 running parallel thereto, a glazing interior surface 3 and an outer surface 4. The outer surface 4 runs perpendicular to the pane contact surfaces 2.1, 2.2 and joins the pane contact surfaces 2.1 and 2.2. The sections of the outer surface 4 nearest the pane contact surfaces 2.1 and 2.2 are inclined at an angle of approx. 45° relative to the surface 4 in the direction of the pane contact surfaces 2.1 and 2.2. A hollow chamber 5 is situated between the outer surface 4 and the glazing interior surface 3. The first pane 12 of the insulating glazing I is joined to the first pane contact surface 2.1 of the spacer 1 via a sealant 7, while the second pane 13 is joined to the second pane contact surface 2.2 via a sealant 7. The intermediate space between the first pane 12 and the second pane 13, delimited by the glazing interior surface 3, is defined as the inner interpane space 15. The inner interpane space 15 is connected to the hollow chamber 5 positioned thereunder via the air inlets 18 in the glazing interior surface. The air inlets 18 are uniformly distributed along the entire spacer 1. A desiccant 11, which extracts the atmospheric humidity from the inner interpane space 15, is situated in the hollow chamber 5. The outer interpane space 16, which is delimited by the outer surface 4 and the first pane 12 and the second pane 13, is completely filled with the outer seal 14. The first pane 12 and the second pane 13 are made of soda lime glass with a thickness of 4 mm in each case. The width of the glazing interior surface 3, which defines the distance between the first pane 12 and the second pane 13, is 35 mm.

This width of the glazing interior is sufficient to accommodate a blind. A pressure equalization body 8 is embedded in the outer surface 4 of the spacer 1 via an opening 17, here, a bore. The pressure equalization body 8 has, in the section with which it is inserted into the outer surface into the spacer 1, a narrowing 27. Situated in the region of the narrowing 27 is a screw thread (not shown) via which the pressure equalization body 8 is screwed into the spacer 1. A sealant 7 (not shown) is applied between the pressure equalization body 8 and the spacer 1. The pressure equalization body 8 is installed completely within the edge seal in the region of the outer seal 14 and does not protrude beyond the common peripheral edge K of the first pane 12 and of the second pane 13. The pressure equalization body 8 comprises a membrane 9 and a capillary 10. The details of the pressure equalization body 8 are described in FIG. 2.

FIG. 1*b* depicts a cross-section of another embodiment of the insulating glazing according to the invention with a hollow profile spacer and a pressure equalization body 8 with a capillary 10 and a membrane 9. The structure corresponds substantially to that described in FIG. 1*a*. In contrast, the pressure equalization body 8 protrudes in the region of the narrowing 27 through the spacer 1 all the way to the glazing interior surface 3. In the region of the glazing interior surface 3, the spacer 1 has, for this purpose, another opening 17, through which the pressure equalization body 8 passes.

FIG. 2 depicts a cross-section of the embodiment of the pressure equalization body according to the invention of FIG. 1*a* comprising a sleeve 20 and a plug-on part 21. The sleeve 20 includes a first section 19.1 of the capillary 10. This extends from an inner surface 26 of the pressure equalization body 26 to the membrane 9. The membrane 9 is inserted into the sleeve 20 and fixed by clamping between it and the plug on part 21. The plug-on part 21 is implemented in the form of a grub screw, which is screwed into a corresponding thread of the sleeve 20 (not shown). This securely fixes the membrane 9. The plug-on part 21 comprises a second section 19.2 of the capillary 10. The pressure equalization body 8 is inserted into the spacer 1 of an insulating glazing such that it is embedded with the inner surface 26 in the outer surface of the spacer 1 (see FIG. 1). The pressure equalization body 8 has, in the region thereof adjacent the inner surface 26, a narrowing 27. In the installed state, the outer surface 25 of the pressure equalization body 8 is oriented in the direction of the outer environment of the insulating glazing. The plug-on part 21 has a second section 19.2 of the capillary 10, which connects the atmosphere to the membrane 9 air-permeably. The sleeve 20 and the plug-on part 21 are made of stainless steel. The capillary 10 is a bore with a diameter of 0.3 mm, which is introduced into the sleeve 20 and the plug-on part 21. The capillary 10 has a total length of 6 mm, wherein the first section 19.1 of the capillary 10 has length of 4 mm, and the second section 19.2 has a length of 2 mm. The membrane 9 is a sintered PTFE membrane with a thickness of 0.2 mm and air permeability of 1.0 liters per hour over an area of 1.1 $mm^2$ before installation in the pressure equalization body 8. Situated at the ends of the first capillary section 19.1 and the second capillary section 19.2 immediately adjacent the membrane 9 is in each case a recess 28 with a depth of 0.25 mm and a diameter of 1.8 mm. This causes free oscillation of the membrane 9 and thus uniform air flow.

FIG. 3 depicts a cross-section of another possible embodiment of the pressure equalization body according to the invention comprising a sleeve 20 and a plug-on part 21 with a capillary 10 of variable diameter and a membrane 9. The basic structure corresponds to the structure described in FIG. 2. In contrast, the capillary 10 has four sections of different internal diameter. A first section 19.1 with a diameter of 0.8 mm and a length of 3.0 mm adjacent the inner surface 26 of the pressure equalization body 8 followed by a second section 19.2 with a diameter of 0.3 mm and a length of 1.0 mm are inserted into the sleeve 20. A third section 19.3 with a diameter of 0.3 mm and a length of 1.0 mm and a fourth section 19.4 with a diameter of 0.8 mm and a length of 1.0 mm are introduced into the plug-on part 21, with section 19.3 positioned in the vicinity of the membrane 9. This embodiment has the advantage that the fraction of the bore with a very small diameter of 0.3 mm is reduced. As a result, the bore can be produced with substantially less time and cost. The sections of the capillary that have the smallest inner diameter are placed in the vicinity of membrane in order to keep the water vapor concentration as low as possible.

EXAMPLE AND COMPARATIVE EXAMPLE

The inventors have carried out various experiments with pressure equalization bodies according to the invention and with prior art capillary tubes. The experiments were carried out in accordance with the standards DIN EN 1279-2 for constant climate alternating with alternating climate and DIN EN 1279-6 for constant climate. Both standards apply only to insulating glazings as closed systems. Although open systems having a pressure equalization body are not within the scope of the standard, it is nevertheless possible to use them for the construction of the test setup and for evaluation of the test results. In closed systems, the moisture absorption factor described by Index I, which reflects the loading of the desiccant with water, must be below 8% for DIN EN 1279-6 and below 20% for DIN EN 1279-2 to comply with standard. This limit is understandably more difficult to comply with for open systems than for closed systems.

In a first series of experiments, the moisture absorption factor I per DIN EN 1279-6 at constant climate for an insulating glazing per FIG. 1 comprising a pressure equalization body per FIG. 2 with various alternative arrangements was compared. As comparative examples, a pressure equalization body without a capillary as well as a prior art capillary tube were compared with the arrangement according to the invention. In the Example and the Comparative Example, identically structured insulating glazings were used to ensure the validity of the tests.

Experiment 1

The insulating glazing systems with different pressure equalization mechanisms are subjected to a test per EN 1279-6 at constant climate. The membranes used in the Comparative Example 2 and the Example 1 according to the invention are identical in construction and corresponds to the membrane described in FIG. 2. The total length of the capillary is, in the case of the pressure equalization body according to the invention, the sum of the capillary lengths in the individual sections of the capillary (see FIG. 2).

TABLE 2

|  | Comparative Example 1 | Comparative Example 2 | Example 1 |
| --- | --- | --- | --- |
| Pressure equalization via | Capillary tube | Pressure equalization body with membrane | Pressure equalization body with membrane and capillary |
| Total length of capillary | 600 mm | — | 6 mm |
| Inner diameter capillary | 0.6 mm | — | 0.8 mm |
| Membrane | — | Stretched microporous PTFE membrane | Sintered or stretched microporous PTFE membrane |
| Index I | <8% | >8% | <8% |

The pressure equalization body with membrane and without capillary per Comparative Example 2 does not have a sufficient barrier for water vapor such that, in this case, a moisture absorption factor I in the range of far above the standard-conforming limit of 8% was measured. Although the use of a capillary tube per Comparative Example 1 yields the desired compliance with the standard, capillary tubes are difficult to integrate into the insulating glazing due to their disadvantageous length. Capillaries are usually inserted into the edge region of the insulating glazing, which contains an outer seal. This outer seal is preferably injected by automation into the outer interpane space. When capillaries are used, this is not possible since the capillary tube forms a physical obstacle that cannot be bypassed automatically. Furthermore, the edge filling must enclose the capillary tube exactly and there must be no air bubbles enclosed in the edge seal. Thus, with the use of capillary tubes, local manual sealing is necessary. Surprisingly, the inventors found that the combination of a short capillary with a membrane already suffices to satisfy the requirements of DIN EN 1279-6. This synergetic effect was surprising and unexpected.

Experiment 2

In a further experiment, a series of pressure equalization bodies according to the invention were produced, in which the inner diameter of the capillary is varied. The basic structure corresponds to that described in FIG. 2. The membranes used in Examples Examples 1 to 4 according to the invention are identical in structure and correspond to the membrane described in FIG. 2. The pane arrangements are subjected to a test per EN 1279-6 in a constant climate.

TABLE 3

|  | Example 1 | Example 2 | Example 3 | Example 4 |
| --- | --- | --- | --- | --- |
| Pressure equalization via | Pressure equalization body with membrane and capillary | | | |
| Total length of capillary | 6 mm | 6 mm | 6 mm | 6 mm |
| Inner diameter of capillary | 0.8 mm | 0.6 | 0.4 mm | 0.3 mm |
| Membrane | Sintered microporous PTFE membrane | See Example 1 | See Example 1 | See Example 1 |
| Index I | 7% | 5% | 3% | 1.5% |

As the diameter of the capillary become smaller, the amount of water entering the glazing also decreases. However, surprisingly, the volume flow remains almost constant as the capillary diameter is reduced. For this, the permeability of the membrane seems consequently to be the primary decisive factor. Supplementing the results from Experiment 2, the air volume flow was determined for a pressure equalization body according to the invention with a capillary diameter of 1.2 mm and 0.6 mm. With a diameter of 1.2 mm, the volume flow is 0.65 L/h with a pressure difference of 30 mbar and a flow area of 1.1 mm$^2$. An identical pressure equalization body with a bore of 0.6 mm provides only an insignificantly lower volume low flow of 0.62 L/h under the same conditions. Thus, even with smaller capillary diameters, sufficiently fast pressure equalization can occur, since the volume flow is mainly controlled via the membrane.

Further experiments with alternating climate per DIN EN 1279-2 (not shown here) showed that insulating glazings with a pressure equalization body according to the invention also satisfy this standard.

Experiment 3

In a third experiment, the pressure equalization body according to the invention per Example 4 and FIG. 2 was compared with a pressure equalization body according to the invention per FIG. 3 (Example 5). Experiment 3 served as a model experiment in which the pressure equalization body was investigated in a bottle setup instead of an insulating glazing. The pressure equalization bodies are introduced into the closure of a bottle with a defined volume with a defined quantity of desiccant, with the air exchange between the bottle volume and the environment occurring completely via the pressure equalization body. Such a test setup is very well suited for comparing various in a simple manner without having to produce an insulating glazing for this purpose. The absolute values of the bottle test calculated for Index I (Experiment 3) are not comparable to the values of the experiments 1 and 2, since the diffusion of gases and water vapor through the edge seal of the insulating glazing is ignored in the bottle test. The pressure equalization body per FIG. 3 has multiple capillary sections having different diameters. The total length of the capillary is the sum of the capillary lengths in the individual sections of the capillary (see FIG. 3). The bottle setups were subjected to a test per EN 1279-6 in a constant climate (see Table 4).

TABLE 4

|  | Example 4 | Example 5 |
|---|---|---|
| Pressure equalization via | Pressure equalization body with membrane and capillary | |
| Length of capillary | 6 mm | 6 mm |
| Inner diameter of capillary | | |
| Section 1 | 0.3 mm | 0.8 mm |
| Section 2 | 0.3 mm | 0.3 mm |
| Section 3 | | 0.3 mm |
| Section 4 | | 0.8 mm |
| Membrane | Sintered microporous PTFE membrane | See Example 4 |
| Index I Bottle test | 2% | 4% |

Thus, the pressure equalization body per FIG. 3 satisfies the requirements of EN 1279-6 in the bottle test. Although the moisture absorption factor I worsened compared to a through-going bore with a diameter of 0.3 mm (Example 4, FIG. 2), it is to be expected that the requirements of EN 1279-6 are also satisfied with the use of a pressure equalization body per FIG. 3 in an insulating glazing. The pressure equalization body per FIG. 3 thus enables simple, economical production along with good moisture retention (Index I=4% in the bottle test).

Practical tests on insulating glazings have shown that a pressure equalization body per FIG. 2 with a capillary bore with a constant diameter of approx. 0.40 mm is well-suited for moisture retention and pressure equalization and offers an economically advantageous solution in terms of manufacturing costs.

FIG. 4 depicts a cross-section of another possible embodiment of the pressure equalization body 8 according to the invention comprising a monolithic main body 24 with a capillary 10 and a membrane 9 on the outer surface 25 of the pressure equalization body 8. The pressure equalization body 8 is introduced into the spacer 1 of an insulating glazing such that it is embedded with the inner surface 26 in the outer surface of the spacer 1 (see FIG. 1). In the region of the pressure equalization body 8 adjacent the inner surface 26, it has a narrowing 27. In the installed state, the outer surface 25 of the pressure equalization body 8 is oriented in the direction of the outer environment of the insulating glazing. The monolithic main body 24 has a through-going capillary 10 of constant diameter between the outer surface 25 and the inner surface 26. The monolithic main body 24 is made of polyethylene vinyl alcohol and is produced, for example, as an injection-molded part. The capillary 10 is a capillary tube made of stainless steel with an inner diameter of 0.25 mm and an outer diameter of 1.8 mm. Such capillary tubes are economically available commercially. A bore corresponding to the outer diameter of the capillary tube is introduced into the monolithic main body 24, into which bore the capillary tube is pushed. This bore with a diameter of 1.8 mm is likewise economical to produce. The membrane 9 is a sintered PTFE membrane with a thickness of 0.13 mm and air permeability of 1.0 liters per hour (over an area of 1.1 mm$^2$) before installation on the pressure equalization body 8. The membrane is applied to the outer surface 25 of the pressure equalization body 8 via an adhesive, skipping the region of the capillary 10. The adhesive serves simultaneously for fixing and sealing. Due to the fact that the membrane 9 is oriented toward the outer surface 25, the entry of liquid water into the capillary 10 is prevented. Situated at the end of the capillary 10 immediately adjacent the membrane 9 is a recess 28 with a depth of 0.25 mm and a diameter of 1.8 mm.

FIG. 5 depicts a cross-section of another possible embodiment of the pressure equalization body 8 according to the invention comprising a monolithic main body 24 with a capillary 10 and a membrane 9 on the inner surface 26 of the pressure equalization body 8. The basic structure corresponds to that described in FIG. 4. In contrast, the membrane is fixed on the inner surface 26 of the monolithic main body 24 via an adhesive. This embodiment is advantageous for protecting the membrane against external mechanical influences during transport of the insulating glazing.

FIG. 6 depicts another embodiment of an insulating glazing I comprising a spacer frame with a pressure equalization body 8 according to the invention and a perforated region 6 in the glazing interior surface 3 of the spacer 1. The spacer 1 of the spacer frame corresponds substantially to that described in FIG. 1. In contrast to FIG. 1, the air inlets 18 are not uniformly distributed along the entire spacer frame, but, instead, are situated only in certain regions. In the present case, a perforated region 6 with air inlets 18 is introduced into the glazing interior surface 3 at the edge of the spacer frame opposite the pressure equalization body 8. The spacers 1 situated at the edges of the spacer frame are plugged together at the corners of the insulating glazing I via corner connectors 23. In this region, the air inlets 18 enable gas exchange between the hollow chamber 5 and the inner interpane space 15. The air inlets 18 are formed as slits with a width of 0.2 mm and a length of 2 mm. The slits ensure optimum air exchange without the desiccant 11 being able to penetrate out of the hollow chamber 5 into the interior of the glazing. The pressure equalization within the spacer 1 filled with desiccant 11 occurs as already described by means of the pressure equalization body 8. An airflow entering through the pressure equalization body 8 first flows due to the capillary action of the spacer 1 filled with desiccant 11 along the region without air inlets 18. The airflow passes the desiccant introduced in the hollow chamber of the spacer, while, at the same time, an air exchange between the hollow chamber and the interior of the glazing is prevented. Thus, the air flow is first pre-dried before then entering the following permeable region 6 in the interior of the insulating glazing I. Such measures for further reduction of the atmospheric humidity in the inner interpane space 15 are unnecessary when using the pressure equalization body 8 according to the invention 8, but can optionally be provided. The pressure equalization body 8 has a cover 22, which is removed after installation of the insulating glazing I in a frame and prevents contamination of the pressure equalization body 8. The insulating glazing I is installed in a window frame such that the pressure equalization body 8 ends up in the upper third of the glazing against a vertically arranged surface and thus is protected against water accumulation.

FIG. 7 depicts a flowchart of a possible embodiment of the method according to the invention for producing an insulating glazing comprising the steps:
I Providing a spacer 1
II Bonding the first pane 12 to the first pane contact surface 2.1 of the spacer 1 via a sealant 7
III Bonding the second pane 13 to the second pane contact surface 2.2 of the spacer 1 via a sealant 7
IV Pressing the pane assembly comprising the panes 12 and 13 and the spacer 1
V Filling the outer interpane space 16 with an outer seal 14

VI Drilling an opening 17 on the outer surface 4 of the spacer 1

VII Inserting a pressure equalization body 8 in die opening 17 of the spacer 1 under use of a sealant 7

FIGS. 8a, 8b, and 8c depict another embodiment of the pressure equalization body 8 according to the invention 8 with a movably mounted membrane 9. Analogous to FIG. 1a, the pressure equalization body 8 is mounted in the spacer 1 of an insulating glazing I. For the sake of clarity, only the pressure equalization body 8 without the spacer 1 is depicted in this view. The pressure equalization body 8 is formed in two parts from a sleeve 20 with a capillary 10 and a plug-on part 21 with a capillary 10. The plug-on part 21 can be plugged, or preferably screwed onto the sleeve 20. Situated in the interior of the pressure equalization body 8 is a hollow space 30, which, in the installed state, is connected to the inner interpane space via the capillary 10 in the sleeve 20 and to the environment via the capillary 10 of the plug-on part 21. The air exchange between the inner interpane space and the environment occurs exclusively via the hollow space 30. A spherical membrane 9 is movably mounted in the hollow space 30. FIG. 8a depicts the assembly in the non-pressurized state, wherein the internal pressure of the insulating glazing corresponds to the ambient pressure. The membrane 9 is preferably dimensioned such that the diameter of the spherical membrane 9 substantially corresponds to the diameter of the hollow space 30 and the membrane 9 thus already touches the wall of the hollow space in the non-pressurized state per FIG. 8a. As a result, even with small pressure differences, quick sealing is done by the movably mounted membrane 9. The state of the membrane 9 in the case of overpressure in the insulating glazing I is depicted in FIG. 8b. The regions of the hollow space 30 adjacent the ends of the capillary sections are funnel-shaped as a receptacle for the spherical membrane 9 and to form a sealing region therewith, in which the wall of the hollow space 30 and the membrane 9 touch. In the event of overpressure in the insulating glazing I, the membrane 9 is pressed out of the neutral position of FIG. 8a into the funnel-shaped region of the hollow space 30, which is adjacent the plug-on part 21 (FIG. 8b). The membrane 9 forms a seal there such that the air exchange through the pressure equalization body 8 takes place completely via the membrane 9. When there is negative pressure in the insulating glazing I, the membrane 9 is analogously displaced out of the neutral position (FIG. 8a) in the direction of the region of the hollow space 30 adjacent the inner interpane space. Situated there as well is a funnel-shaped section of the hollow space, against which the membrane 9 rests and seals the hollow space (FIG. 8c). This prevents air from flowing past the membrane 9. In this pressure condition as well, the air exchange takes place completely via the memory 9. The advantages of the combination of the membrane and the capillary described in FIG. 2 apply with regard to the embodiment of FIG. 8. The embodiment of FIG. 8 further offers the advantage of simple assembly. The membrane need not be fixed in the pressure equalization body, but, instead, can be inserted loose therein. In addition, there are higher manufacturing tolerances since the seal between the membrane 9 and the pressure equalization body 8 occurs through pressing of the membrane due to pressure differences and does not have to be ensured at the time of installation of the membrane.

FIG. 9 depicts a plan view of a pressure equalization body 8 in accordance with one of the embodiments of FIG. 2 or 3. The pressure equalization body 8 comprises, as already described with FIGS. 2 and 3, a sleeve 20, into which a plug-on part 21 is inserted. The plug-on part 29 has a through-opening 29, through which ambient air reaches the capillary of the pressure equalization body. The through-opening 29 can be shaped such that a tool, for example, a hexagon, can engage therein to screw the plug-on part 21 to the sleeve 20. The pressure equalization body 8 has a first section 8a, which is situated in the region of the outer seal 14 after assembly of the pressure equalization body 8, and a second section 8b, which is used to attach the pressure equalization body 8. In the region of the second section 8b, there is a taper 27 with threads via which the pressure equalization body 8 is screwed into the spacer.

Figures 10A, 10B:
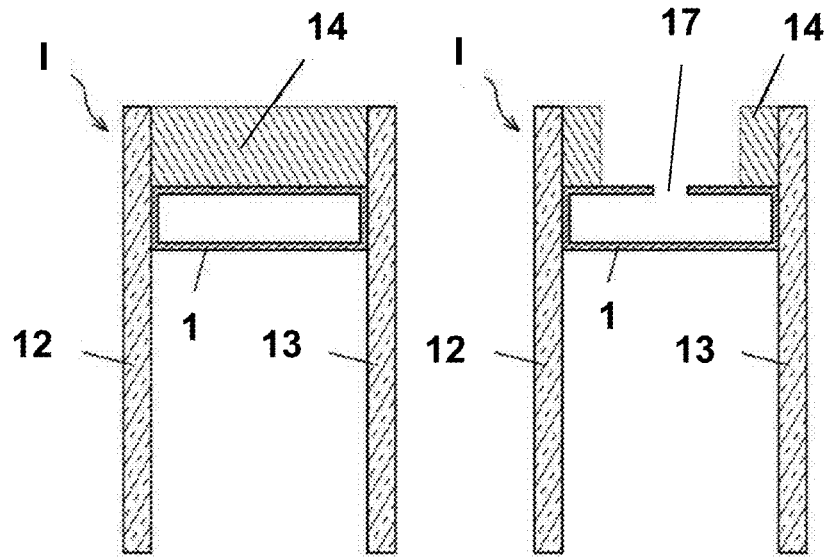
Figures 10C, 10D:
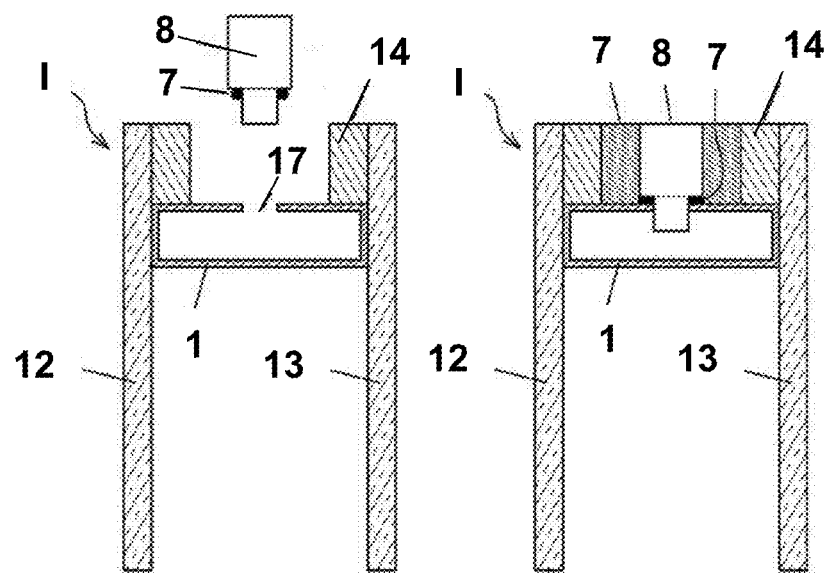

FIG. 10 a-d depict a schematic representation of the process steps during assembly of a pressure equalization body 8 in an insulating glazing I. FIG. 10a depicts an insulating glazing I of FIG. 1a with the difference that in FIG. 10a no pressure equalization body 3 has yet been inserted. With regard to other features, the insulating glazing I corresponds to that described in FIG. 1a. For the sake of improved clarity, the desiccant within the spacer 1 is not shown in FIG. 10 a-d. For inserting the pressure equalization body, a part of the outer seal 14 is removed, for example, drilled, in order to create an opening 17 in the outer surface of the spacer 1 in the region of the exposed spacer 1 (FIG. 10b). The opening 17 is dimensioned such that a pressure equalization body 8 in accordance with FIG. 9 can be inserted into the spacer 1 in the region of the taper 27. The pressure equalization body 8 is provided with a circumferential strand of sealant 7 in the region of the taper 27, immediately adjacent the first section of the pressure equalization body 8 (see FIG. 10c). At the time of insertion of the pressure equalization body 8 into the outer surface of the spacer, the sealant strand is pressed along with the adjacent components such that the sealant 7 seals the opening 17 on the pressure equalization body 8 and prevents an air flow from flowing by at the outer side of the pressure equalization body 8. After insertion of the pressure equalization body 8, the region surrounding the pressure equalization body 8, in which the outer seal 14 was removed is filled with sealant 7 (FIG. 10d). To ensure that no sealant enters the through-opening 29 of the plug-on part 21, the pressure equalization body 8 can be temporarily provided with a cover (not shown), which is removed again afterward.

LIST OF REFERENCE CHARACTERS

I insulating glazing
1 spacer
2 pane contact surfaces
2.1 first pane contact surface
2.2 second pane contact surface
3 glazing interior surface
4 outer surface
5 hollow chamber
6 permeable region
7 sealant
8 pressure equalization body
8a first section of the pressure equalization body 8
8b second section of the pressure equalization body 8
9 membrane
10 capillary
11 desiccant
12 first pane
13 second pane
14 outer seal
15 inner interpane space
16 outer interpane space 17 opening
18 air inlet
19 sections of the capillary 10
19.1 first section of the capillary 10
19.2 second section of the capillary 10
20 sleeve
21 plug-on part
22 cover
23 plug connector
24 monolithic main body
25 outer surface of the pressure equalization body 8
26 inner surface of the pressure equalization body 8
27 taper
28 recess
29 through-opening in plug-on part 21
30 hollow space
K common peripheral edge of the first pane 12 and of the second pane 13

The invention claimed is:

1. An insulating glazing having a pressure equalization body comprising a capillary and a membrane for permanent pressure equalization of the insulating glazing, at least comprising a first pane, a second pane, and a circumferential spacer with a first pane contact surface, a second pane contact surface running parallel thereto, a glazing interior surface, an outer surface, a hollow chamber, and a desiccant within the hollow chamber,
wherein
the first pane is mounted on the first pane contact surface and the second pane is mounted on the second pane contact surface,
the first pane, the second pane, and the glazing interior surface enclose an inner interpane space,
the first pane, the second pane, and the outer surface enclose an outer interpane space,
the pressure equalization body is inserted into an opening on the outer surface of the spacer and opens into the hollow chamber,
the glazing interior surface includes at least one permeable region, which gas-permeably connects the hollow chamber to the inner interpane space,
the pressure equalization body contains at least one gas-permeable membrane and at least one capillary,
the inner interpane space is gas-permeably connected to the atmosphere via the capillary and the membrane, and
the capillary has, in at least one section, an inner diameter less than or equal to 0.80 mm.

2. The insulating glazing according to claim 1, wherein at least one first section of the capillary lies between the membrane and the inner interpane space.

3. The insulating glazing according to claim 2, wherein a second section of the capillary is arranged between the membrane and the surrounding atmosphere.

4. The insulating glazing according to claim 3, wherein the membrane is fixed or is movably mounted between the first section of the capillary and the second section of the capillary.

5. The insulating glazing according to claim 2, wherein a second section of the capillary is adjacent the first section of the capillary, and the membrane is arranged adjacent the surrounding atmosphere.

6. The insulating glazing according to claim 1, wherein at least one of the capillary sections directly adjacent the membrane includes a recess in the vicinity of the membrane.

7. The insulating glazing according to claim 1, wherein the membrane includes a polymer from the group of polyhalo-olefins or a metal oxide-containing ceramic.

8. The insulating glazing according to claim 1, wherein the total length of the capillary is less than or equal to 6 cm.

9. The insulating glazing according to claim 1, wherein the pressure equalization body contains metals or gas-tight plastics.

10. The insulating glazing according to claim 1, wherein the spacer includes a polymeric main body and the outer surface of the spacer has a gas-tight and vapor-tight barrier.

11. A method for producing an insulating glazing according to claim 1, comprising:
a) providing one spacer with a first pane contact surface, one second pane contact surface running parallel thereto, one glazing interior surface, and one outer surface,
b) connecting the first pane to the first pane contact surface of the spacer via a sealant, and
connecting the second pane to the second pane contact surface of the spacer via a sealant,
c) pressing the pane assembly comprising the first and second panes and the spacer together,
d) filling an outer interpane space between the first pane, the second pane, and the spacer with an outer seal,
e) producing an opening on the outer surface of the spacer, and
f) inserting a pressure equalization body into the opening of the spacer,
wherein steps e) and f) can occur before or after step d).

12. The method for producing an insulating glazing according to claim 11, wherein in step f), the pressure equalization body is reversibly closed with a cover.

13. A method comprising providing the insulating glazing according to claim 1, and installing said insulating glazing in a building.

14. The insulating glazing according to claim 4, wherein the membrane is fixed between the first section of the capillary and the second section of the capillary.

15. The insulating glazing according to claim 1, wherein the diameter is less than or equal to 0.50 mm.

16. The insulating glazing according to claim 7, wherein the polymer is polytetrafluoroethylene.

17. The insulating glazing according to claim 9, wherein the pressure equalization body contains aluminum, stainless steel, polyethylene vinyl alcohol (EVOH), low-density polyethylene (LDPE), biaxially oriented polypropylene film (BOPP), and/or copolymers and/or mixtures thereof.

18. The insulating glazing according to claim 1, wherein the pressure equalization body includes a narrowing portion that extends through the opening, said at least one capillary extending within the narrowing portion of the pressure equalization body.

19. The insulating glazing according to claim 1, wherein
the membrane is arranged between two adjacent sections of the capillary, or
the membrane is arranged adjacent a distal end of the capillary and positioned on (i) an inner surface of the pressure equalization body that faces towards an interior space of the glazing or on (ii) an outer surface of the pressure equalization body that faces towards an exterior environment of the glazing.

20. The insulating glazing according to claim 1, further comprising a recess between the at least one section of the capillary and the membrane, the recess having a diameter between 1.5 mm and 5.0 mm and a depth between 0.1 mm and 1.0 mm.

* * * * *